(12) United States Patent
Hashimoto et al.

(10) Patent No.: US 10,684,710 B2
(45) Date of Patent: *Jun. 16, 2020

(54) TRANSPARENT CONDUCTIVE FILM AND TOUCH PANEL

(71) Applicant: FUJIFILM Corporation, Tokyo (JP)

(72) Inventors: Kiyokazu Hashimoto, Shizuoka (JP); Kentaro Okazaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,295

(22) Filed: Jan. 17, 2019

(65) Prior Publication Data

US 2019/0155413 A1 May 23, 2019

Related U.S. Application Data

(63) Continuation of application No. 14/843,426, filed on Sep. 2, 2015, now Pat. No. 10,228,782, which is a (Continued)

(30) Foreign Application Priority Data

Mar. 4, 2013 (JP) .................................. 2013-041688

(51) Int. Cl.
*G06F 3/041* (2006.01)
*B29C 48/07* (2019.01)
(Continued)

(52) U.S. Cl.
CPC .............. *G06F 3/041* (2013.01); *B29C 48/07* (2019.02); *B29C 48/08* (2019.02); *B29C 48/12* (2019.02);
(Continued)

(58) Field of Classification Search
CPC . G06F 3/041; G06F 3/044; G06F 1/16; G06F 2203/04103; G06F 2203/04112;
(Continued)

(56) References Cited

U.S. PATENT DOCUMENTS 6,342,549 B1 1/2002 Hirose et al.
7,144,688 B2 12/2006 Nakagawa et al.
(Continued)

FOREIGN PATENT DOCUMENTS

CN 101454384 A 6/2009
JP H02-141278 A 5/1990
(Continued)

OTHER PUBLICATIONS

Espacenet Translation of JP2011210579A (Year: 2019).*
(Continued)

*Primary Examiner* — Michael Zhang
(74) *Attorney, Agent, or Firm* — Edwards Neils LLC; Jean C. Edwards, Esq.

(57) ABSTRACT

A transparent conductive film having a transparent resin film containing a cyclic olefin resin, an undercoating layer formed on the transparent resin film, and a conductive layer and having a thermal dimensional change rate in hot water at 100° C. for 60 seconds of from 0.01 to 0.2%, which shows excellent adhesion between the transparent resin film and the conductive layer.

11 Claims, 1 Drawing Sheet

Related U.S. Application Data continuation of application No. PCT/JP2014/055224, filed on Mar. 3, 2014.

(51) Int. Cl.

| | | |
|---|---|---|
| *B29C 48/12* | (2019.01) | |
| *B29C 48/21* | (2019.01) | |
| *G06F 3/044* | (2006.01) | |
| *B29C 48/92* | (2019.01) | |
| *B29C 48/08* | (2019.01) | |
| *G06F 1/16* | (2006.01) | |
| *B29K 23/00* | (2006.01) | |
| *B29C 48/30* | (2019.01) | |
| *B29C 48/305* | (2019.01) | |
| *B29K 45/00* | (2006.01) | |
| *B29L 31/34* | (2006.01) | |

(52) U.S. Cl.
CPC .............. *B29C 48/21* (2019.02); *B29C 48/92* (2019.02); *G06F 1/16* (2013.01); *G06F 3/044* (2013.01); *B29C 48/30* (2019.02); *B29C 48/305* (2019.02); *B29C 2948/92704* (2019.02); *B29K 2023/38* (2013.01); *B29K 2045/00* (2013.01); *B29K 2995/0005* (2013.01); *B29K 2995/0026* (2013.01); *B29L 2031/3475* (2013.01); *G06F 2203/04103* (2013.01); *G06F 2203/04112* (2013.01)

(58) Field of Classification Search
CPC . B29C 47/065; B29C 47/0019; B29C 47/003; B29C 47/92; B29C 47/0021; B29C 47/14; B29C 2947/92704; B29K 2995/0005; B29K 2995/0026; B29K 2023/38; B29K 2045/00; B29L 2031/3475
See application file for complete search history.

(56) References Cited

U.S. PATENT DOCUMENTS

| | | | |
|---|---|---|---|
| 7,381,520 | B2 | 6/2008 | Nakagawa et al. |
| 7,537,800 | B2 | 5/2009 | Sasaki et al. |
| 7,796,327 | B2 | 9/2010 | Sasaki |
| 7,934,966 | B2 | 5/2011 | Sasaki et al. |
| 8,012,676 | B2 | 9/2011 | Yoshiki et al. |
| 8,153,044 | B2 | 4/2012 | Hashimoto et al. |
| 8,177,954 | B2 | 5/2012 | Fujita |
| 8,253,035 | B2 | 8/2012 | Matsumoto |
| 8,383,331 | B2 | 2/2013 | Nakamura et al. |
| 8,492,296 | B2 | 7/2013 | Sasaki et al. |
| 8,658,907 | B2 | 2/2014 | Ichiki |
| 9,034,419 | B2 | 5/2015 | Sasaki et al. |
| 10,228,782 | B2 * | 3/2019 | Hashimoto ............ B29C 48/21 |
| 2004/0115572 | A1 | 6/2004 | Tsukada et al. |
| 2004/0229028 | A1 | 11/2004 | Sasaki et al. |
| 2004/0234910 | A1 | 11/2004 | Nakagawa et al. |
| 2005/0151890 | A1 | 7/2005 | Nishimura |
| 2006/0008745 | A1 | 1/2006 | Sasaki et al. |
| 2006/0014113 | A1 | 1/2006 | Nakagawa |
| 2006/0204908 | A1 | 9/2006 | Nakagawa et al. |
| 2007/0076155 | A1 | 4/2007 | Nakayama et al. |
| 2008/0176173 | A1 | 7/2008 | Sasaki et al. |
| 2008/0211371 | A1 | 9/2008 | Sasaki et al. |
| 2009/0011669 | A1 | 1/2009 | Sasaki et al. |
| 2009/0020712 | A1 | 1/2009 | Matsumoto |
| 2009/0029125 | A1 | 1/2009 | Nakahira |
| 2009/0040436 | A1 * | 2/2009 | Suzuki ................ C08F 232/08 349/96 |
| 2009/0042005 | A1 | 2/2009 | Hashimoto et al. |
| 2009/0052017 | A1 | 2/2009 | Sasaki |
| 2009/0078459 | A1 | 3/2009 | Nishizakura |
| 2009/0098480 | A1 | 4/2009 | Nakahira |
| 2009/0098481 | A1 | 4/2009 | Nakahira |
| 2009/0110912 | A1 | 4/2009 | Sasaki et al. |
| 2009/0117346 | A1 | 5/2009 | Nakahira |
| 2009/0133922 | A1 | 5/2009 | Okazaki et al. |
| 2009/0218127 | A1 | 9/2009 | Fujita |
| 2009/0233237 | A1 | 9/2009 | Yoshiki et al. |
| 2009/0297870 | A1 | 12/2009 | Takeyama et al. |
| 2010/0216963 | A1 | 8/2010 | Ueda |
| 2010/0243923 | A1 * | 9/2010 | Sakuyama ............... G03C 1/85 250/515.1 |
| 2011/0275021 | A1 | 11/2011 | Nakamura et al. |
| 2011/0308846 | A1 | 12/2011 | Ichiki |
| 2012/0094071 | A1 | 4/2012 | Itoh et al. |
| 2012/0241199 | A1 | 9/2012 | Kobayashi et al. |
| 2014/0102764 | A1 | 4/2014 | Fujino et al. |
| 2014/0234760 | A1 | 8/2014 | Sasaki et al. |

FOREIGN PATENT DOCUMENTS

| | | |
|---|---|---|
| JP | H06-087148 A | 3/1994 |
| JP | 2002-113758 A | 4/2002 |
| JP | 3377833 B2 | 2/2003 |
| JP | 2003-202810 A | 7/2003 |
| JP | 2003-266520 A | 9/2003 |
| JP | 2003-279741 A | 10/2003 |
| JP | 2004-085655 A | 3/2004 |
| JP | 2004-184693 A | 7/2004 |
| JP | 2004-221564 A | 8/2004 |
| JP | 2004-221565 A | 8/2004 |
| JP | 2004-244080 A | 9/2004 |
| JP | 2004-334077 A | 11/2004 |
| JP | 2005-010752 A | 1/2005 |
| JP | 2005-043740 A | 2/2005 |
| JP | 3683631 B2 | 8/2005 |
| JP | 2005-302508 A | 10/2005 |
| JP | 3723616 B2 | 12/2005 |
| JP | 2006-010795 A | 1/2006 |
| JP | 2006-012935 A | 1/2006 |
| JP | 2006-153983 A | 6/2006 |
| JP | 2006-228469 A | 8/2006 |
| JP | 2006-228473 A | 8/2006 |
| JP | 2006-228478 A | 8/2006 |
| JP | 2006-228836 A | 8/2006 |
| JP | 2006-231763 A | 9/2006 |
| JP | 2006-255892 A | 9/2006 |
| JP | 2006-261315 A | 9/2006 |
| JP | 2006-269795 A | 10/2006 |
| JP | 2006-324203 A | 11/2006 |
| JP | 2006-332459 A | 12/2006 |
| JP | 2006-336090 A | 12/2006 |
| JP | 2006-336099 A | 12/2006 |
| JP | 2006-348351 A | 12/2006 |
| JP | 2006-352073 A | 12/2006 |
| JP | 2007-002027 A | 1/2007 |
| JP | 2007-009326 A | 1/2007 |
| JP | 2007-013130 A | 1/2007 |
| JP | 2007-072171 A | 3/2007 |
| JP | 2007-088219 A | 4/2007 |
| JP | 2007-102200 A | 4/2007 |
| JP | 2007-116137 A | 5/2007 |
| JP | 2007-129205 A | 5/2007 |
| JP | 2007-134439 A | 5/2007 |
| JP | 2007-149760 A | 6/2007 |
| JP | 2007-178915 A | 7/2007 |
| JP | 2012-133386 A | 7/2007 |
| JP | 2007-200922 A | 8/2007 |
| JP | 2007-201378 A | 8/2007 |
| JP | 2007-207883 A | 8/2007 |
| JP | 2007-207987 A | 8/2007 |
| JP | 2007-208133 A | 8/2007 |
| JP | 2007-226215 A | 9/2007 |
| JP | 2007-235115 A | 9/2007 |
| JP | 2007-270321 A | 10/2007 |
| JP | 2007-270322 A | 10/2007 |
| JP | 2007-310091 A | 11/2007 |
| JP | 2007-334325 A | 12/2007 |
| JP | 2007-335729 A | 12/2007 |
| JP | 2008-235467 A | 2/2008 |
| JP | 2008-147507 A | 6/2008 |
| JP | 2008-159770 A | 7/2008 |

(56) References Cited

FOREIGN PATENT DOCUMENTS

| | | |
|---|---|---|
| JP | 2008-159771 A | 7/2008 |
| JP | 2008-171568 A | 7/2008 |
| JP | 2008-198388 A | 8/2008 |
| JP | 2008-218096 A | 9/2008 |
| JP | 2008-218264 A | 9/2008 |
| JP | 2008-218784 A | 9/2008 |
| JP | 2008-224916 A | 9/2008 |
| JP | 2008-227350 A | 9/2008 |
| JP | 2008-227351 A | 9/2008 |
| JP | 2008-235224 A | 10/2008 |
| JP | 2008-241987 A | 10/2008 |
| JP | 2008-244067 A | 10/2008 |
| JP | 2008-250233 A | 10/2008 |
| JP | 2008-251274 A | 10/2008 |
| JP | 2008-251275 A | 10/2008 |
| JP | 2008-252046 A | 10/2008 |
| JP | 2008-267814 A | 11/2008 |
| JP | 2008-270405 A | 11/2008 |
| JP | 2008-273029 A | 11/2008 |
| JP | 2008-273057 A | 11/2008 |
| JP | 2008-277428 A | 11/2008 |
| JP | 2008-277675 A | 11/2008 |
| JP | 2008-277676 A | 11/2008 |
| JP | 2008-282840 A | 11/2008 |
| JP | 2008-283029 A | 11/2008 |
| JP | 2008-288305 A | 11/2008 |
| JP | 2008-288419 A | 11/2008 |
| JP | 2008273029 A * | 11/2008 |
| JP | 2008-300720 A | 12/2008 |
| JP | 2008-300721 A | 12/2008 |
| JP | 2008-307831 A | 12/2008 |
| JP | 2009-004213 A | 1/2009 |
| JP | 2009-010001 A | 1/2009 |
| JP | 2009-016526 A | 1/2009 |
| JP | 2009-021153 A | 1/2009 |
| JP | 2009-021334 A | 1/2009 |
| JP | 2009-026933 A | 2/2009 |
| JP | 2009-083322 A | 4/2009 |
| JP | 2009-090541 A | 4/2009 |
| JP | 2009-122622 A | 6/2009 |
| JP | 2009-154518 A | 7/2009 |
| JP | 2009-176608 A | 8/2009 |
| JP | 2009-203249 A | 9/2009 |
| JP | 2009-277466 A | 11/2009 |
| JP | 4492116 B2 | 6/2010 |
| JP | 2010-164538 A | 7/2010 |
| JP | 2010-198799 A | 9/2010 |
| JP | 2010-256908 A | 11/2010 |
| JP | 2011-034806 A | 2/2011 |
| JP | 2011-043628 A | 3/2011 |
| JP | 4729802 B2 | 7/2011 |
| JP | 4820451 B1 | 9/2011 |
| JP | 2011-21057 A | 10/2011 |
| JP | 2011-197754 A | 10/2011 |
| JP | 2011210579 A * | 10/2011 |
| JP | 2011-253546 A | 12/2011 |
| JP | 2012-004042 A | 1/2012 |
| JP | 2012-025158 A | 2/2012 |
| JP | 2012-066481 A | 4/2012 |
| JP | 2012-080091 A | 4/2012 |
| JP | 2012-151095 A | 8/2012 |
| JP | 2012-216550 A | 11/2012 |
| JP | 2012-229405 A | 11/2012 |
| JP | 2013-001009 A | 1/2013 |
| TW | 201134665 A1 | 10/2011 |
| WO | 2003/081299 A1 | 10/2003 |
| WO | 2006/001461 A1 | 1/2006 |
| WO | 2006/088059 A1 | 8/2006 |
| WO | 2006/098333 A1 | 9/2006 |
| WO | 2006/098334 A1 | 9/2006 |
| WO | 2006/098335 A1 | 9/2006 |
| WO | 2006/098336 A1 | 9/2006 |
| WO | 2006/098338 A1 | 9/2006 |
| WO | 2006/126739 A1 | 11/2006 |
| WO | 2006/129869 A1 | 12/2006 |
| WO | 2006/129886 A1 | 12/2006 |
| WO | 2006/132397 A1 | 12/2006 |
| WO | 2007/001008 A1 | 1/2007 |
| WO | 2007/029852 A1 | 3/2007 |
| WO | 2007/034994 A1 | 3/2007 |
| WO | 2007/037545 A1 | 4/2007 |
| WO | 2007/083849 A1 | 7/2007 |
| WO | 2007/116774 A1 | 10/2007 |
| WO | 2007/116775 A1 | 10/2007 |
| WO | 2007/122932 A1 | 11/2007 |
| WO | 2010/114056 A1 | 10/2010 |
| WO | 2010/140275 A1 | 12/2010 |
| WO | 2011/062301 A1 | 5/2011 |
| WO | 2011/108494 A1 | 9/2011 |
| WO | 2011/162414 A1 | 12/2011 |
| WO | 2012/033103 A1 | 3/2012 |

OTHER PUBLICATIONS

Espacenet Translation of JP2008273029A (Year: 2019).*
International Search Report issued in PCT/JP2014/055224 dated May 27, 2014.
Written Opinion issued in PCT/JP2014/055224 dated May 27, 2014.
Third Party Observation issued in PCT/JP2014/055224 dated Jun. 29, 2015 and Communication Concerning Third Party Observation issued in PCT/JP2014/055224 dated Jul. 16, 2015.
International Preliminary Report on Patentability issued by WIPO dated Sep. 8, 2015 in connection with Intl. Patent Application No. PCT/JP2014/055224.
First Office Action issued by the State Intellectual Property Office of People's Republic of China dated May 4, 2016, in connection with Chinese Patent Application No. 201480012208.3.
Notice of Grounds for Rejection issued by the Korean Intellectual Property Office dated Aug. 23, 2016, in connection with Korean Patent Application No. 2015-7022788.
Second Office Action issued by the State Intellectual Property Office of China dated Nov. 28, 2016, in connection with Chinese Patent Application No. 201480012208.3.
Notification of Reasons for Refusal issued by the Japanese Patent Office dated Jan. 10, 2017, in connection with Japanese Patent Application No. 2013-041688.
Non-Final Office Action issue in U.S. Appl. No. 14/843,426 dated Apr. 17, 2018.
Third Party Submission dated Aug. 24, 2015, in connection with corresponding Japanese Patent Application No. 2013-041688.
Third Party Submission dated Aug. 9, 2016, in connection with corresponding Japanese Patent Application No. 2013-041688.
Third Party Submission dated Feb. 22, 2017, in connection with corresponding Japanese Patent Application No. 2013-041688.
Opposition dated Apr. 4, 2018, in connection with corresponding Japanese Patent Application No. 2013-041688.

* cited by examiner (a)
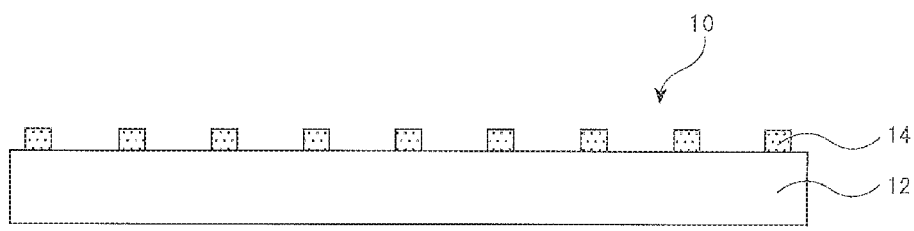
(b)
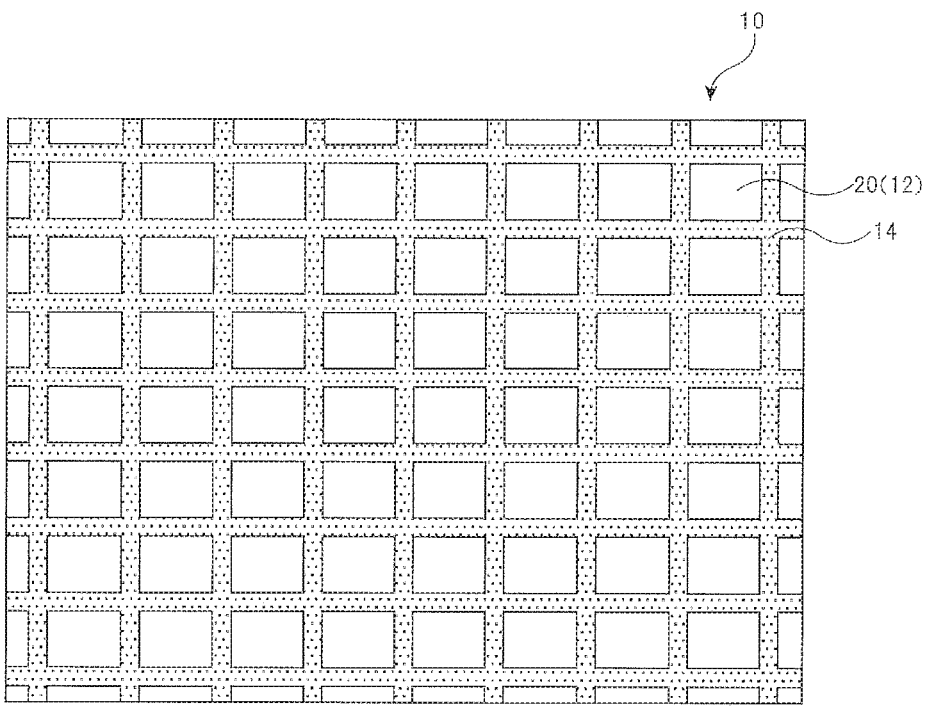

TRANSPARENT CONDUCTIVE FILM AND TOUCH PANEL

CROSS-REFERENCE TO RELATED APPLICATIONS

This application is a Continuation of U.S. patent application Ser. No. 14/843,426, filed on Sep. 2, 2015, which is a Continuation of PCT International Application No. PCT/JP2014/055224, filed on Mar. 3, 2014, which was published under PCT Article 21(2) in Japanese, and claims priority under 35 U.S.C. Section 119(a) to Japanese Patent Application No. 2013-041688 filed on Mar. 4, 2013. The above applications are hereby expressly incorporated by reference, in their entirety, into the present application.

BACKGROUND OF THE INVENTION

Field of the Invention

The present invention relates to a transparent conductive film and a touch panel. Specifically, the invention relates to a transparent conductive film having a thermal dimensional change rate measured under a high temperature and high humidity condition that is within a particular range, and a touch panel using the transparent conductive film.

Background Art

A transparent conductive film containing a support, such as a transparent resin film, having formed thereon a transparent conductive layer has been used in various electronic devices. In recent years, particularly, an electronic device equipped with a touch panel is spreading drastically, and a transparent conductive film used in a capacitance touch panel is being developed.

A film of ITO, which is an indium series oxide, has been mainly used as a transparent conductive layer of a transparent conductive film. The ITO film as a transparent conductive layer has been formed mainly by a sputtering method, but the sputtering method has a problem that a large equipment is required therefor, in addition to the low film forming rate thereof. Due to the reasons, in recent years, a transparent conductive layer is formed with a conductive substance, such as silver, without the use of the sputtering method. The transparent conductive layer of this type is formed as a patterned layer in such a manner that a transparent conductive layer formed as a layer is subjected to an exposure and development treatment to remove a part of the conductive layer (see, for example, Patent Document 1).

Patent Document 2 describes a transparent conductive film containing a transparent resin film substrate having formed thereon a conductive mesh containing silver and a water soluble binder. Patent Document 2 uses a polyethylene naphthalate (PEN) film as the transparent resin film substrate, and describes that a cyclic olefin (COC or COP) may be used as the transparent resin film substrate. Patent Document 2 proposes to enhance the power generation efficiency of an organic thin film solar cell by using the transparent conductive film.

Patent Document 3 describes a transparent conductive film containing a transparent resin film substrate containing a cyclic olefin having formed thereon a mesh conductive layer using a silver based conductive material. Patent Document 3 describes that the transparent conductive film may be used as a filter for a plasma display panel, and a display device.

CITATION LIST

Patent Documents

Patent Document 1: JP-A-2012-4042
Patent Document 2: WO 2012/033103
Patent Document 3: JP-A-2003-202810

SUMMARY OF INVENTION

As described above, a transparent conductive film having a conductive layer formed of a conductive substance, such as silver, has been various electronic devices. It has been known to use a cyclic olefin as a transparent resin film substrate of a transparent conductive film.

However, the use of the transparent conductive film using a cyclic olefin in the transparent resin film may have a problem that the conductive layer is liable to be peeled off from the transparent resin film substrate. The conductive layer being peeled off from the transparent resin film may cause severe problems including disablement of the touch panel function.

For solving the problem in the ordinary techniques, the present inventors have made investigations for providing a transparent conductive film containing a cyclic olefin in a transparent resin film, having excellent adhesion between the conductive layer and the transparent resin film substrate.

As a result of earnest investigations for solving the problem, the inventors have found that in a transparent conductive film containing a cyclic olefin in a transparent resin film, the adhesion property between the conductive layer and the transparent resin film substrate may be enhanced by the transparent conductive film having a thermal dimensional change rate that is within a particular range. According thereto, it has been found that a touch panel having high sensitivity and excellent durability may be provided, and thus the invention has been completed.

Specifically, the invention includes the following embodiments.

(1) A transparent conductive film containing a transparent resin film and a conductive layer formed on the transparent resin film, the transparent resin film containing a cyclic olefin resin, the transparent conductive film having a thermal dimensional change rate in hot water at 100° C. for 60 seconds of from 0.01 to 0.2%.

(2) The transparent conductive film according to the item (1), wherein the conductive layer has an intermittent portion.

(3) The transparent conductive film according to the item (1) or (2), wherein the conductive layer contains a water soluble resin and silver.

(4) The transparent conductive film according to any one of the items (1) to (3), wherein the transparent conductive film has a dielectric constant change rate in a temperature range of from −20 to 30° C. of from 0.1 to 10%.

(5) The transparent conductive film according to any one of the items (1) to (4), wherein the transparent conductive film has an in-plane birefringence (Re) of from 1 to 20 nm and a birefringence in the thickness direction (Rth) of from 1 to 20 nm.

(6) The transparent conductive film according to any one of the items (1) to (5), wherein the transparent conductive film has an in-plane variation in the thermal dimensional change rate in hot water at 100° C. for 60 seconds of from 1 to 10%.

(7) The transparent conductive film according to any one of the items (1) to (6), wherein the transparent conductive film has an in-plane variation in the dielectric constant change rate in a temperature range of from −20 to 30° C. of from 1 to 10%.

(8) The transparent conductive film according to any one of the items (1) to (7), wherein the transparent conductive film has an in-plane variation in the in-plane birefringence (Re) of from 1 to 10% and an in-plane variation in the birefringence in the thickness direction (Rth) of from 1 to 10%.

(9) The transparent conductive film according to any one of the items (1) to (8), wherein the transparent resin film has a thickness of from 20 to 60 μm.

(10) A method for producing a transparent conductive film, containing a step of forming a transparent resin film containing a cyclic olefin resin, and a step of forming a conductive layer on the transparent resin film, the step of forming the transparent resin film containing an extrusion step of forming a molten resin containing a cyclic olefin resin into a sheet, and the extrusion step containing a step of imparting thickness unevenness to the molten resin in the form of a sheet.

(11) The method for producing a transparent conductive film according to the item (10), wherein the step of forming the transparent resin film contains, before the extrusion step, a step of feeding the molten resin containing a cyclic olefin resin to a die, and in the step of feeding the molten resin to the die, a melt pipe for feeding the molten resin to the die is imparted with a temperature distribution of from 1 to 10° C.

(12) The method for producing a transparent conductive film according to the item (10) or (11), wherein the step of forming the transparent resin film contains, before the extrusion step, a step of placing a composition containing a cyclic olefin resin into an extruder, and in the step of placing the composition, the composition is heated to a temperature of from (Tg−80° C.) to Tg.

(13) The method for producing a transparent conductive film according to the item (12), wherein the step of placing the composition contains a step of placing an inert gas into the extruder, and in the step of placing the inert gas, the inert gas is imparted with a variation in a fed amount thereof of from 0.5 to 10%.

(14) The method for producing a transparent conductive film according to any one of the items (10) to (13), wherein the extrusion step contains a step of imparting a vibration of from 10 to 300 per minute to the molten resin.

(15) The method for producing a transparent conductive film according to any one of the items (10) to (14), wherein the extrusion step contains a step of extruding the molten resin onto a cast drum, and the cast drum is imparted with a temperature distribution of from 0.5 to 10° C.

(16) The method for producing a transparent conductive film according to the item (15), wherein the step of forming the transparent resin film contains, after the step of extruding onto the cast drum, a step of making a sheet of the resin into a heat roll, and in the step of making into contact with the heat roll, the heat roll is imparted with a variation in a rotation number thereof of from 0.1 to 5%.

(17) The method for producing a transparent conductive film according to any one of the items (10) to (16), wherein the step of forming the conductive layer contains a step of forming a silver halide emulsion layer, and a step of subjecting the silver halide emulsion layer to an exposure treatment and a development treatment.

(18) A transparent conductive film that is produced by the production method according to any one of the items (10) to (17).

(19) A touch panel containing the transparent conductive film according to any one of the items (1) to (9) and (18).

According to the invention, there may be provided a transparent conductive film containing a cyclic olefin in a transparent resin film, in which the adhesion between the conductive layer and the transparent resin film substrate is enhanced. Accordingly, the use of the transparent conductive film of the invention may provide a touch panel having high sensitivity and excellent durability.

BRIEF DESCRIPTION OF DRAWING

FIG. 1 is a schematic cross sectional view and a schematic plane view showing an embodiment of the transparent conductive film of the invention. In FIG. 1, 10 is transparent conductive film, 12 is transparent resin film, 14 is conductive layer, and 20 is intermittent portion.

DESCRIPTION OF EMBODIMENTS

The invention will be described in detail below. The description for the constitutional components shown below may be made with reference to representative embodiments and specific examples, but the invention is not limited to the embodiments and the examples. In the description, a numerical range expressed with reference to an upper limit and/or a lower limit means a range that includes the upper limit and/or the lower limit.

1. Transparent Conductive Film

The invention relates to a transparent conductive film containing a transparent resin film and a conductive layer formed on the transparent resin film. The transparent resin film contains a cyclic olefin resin. The transparent conductive film has a thermal dimensional change rate in hot water at 100° C. for 60 seconds of from 0.01 to 0.2%. The conductive layer contains a transparent conductive layer. The conductive layer may be formed as a layer, and may be formed in a patterned shape or a mesh shape.

There has been a problem that the adhesion property between the transparent resin film and the conductive layer may be deteriorated in the case where the transparent resin film contains a cyclic olefin. There has also been a problem that the transparent resin film itself is liable to suffer interlayer delamination, and also is liable to suffer embrittlement. It is considered this is because the cyclic olefin support has a large intermolecular void (free volume) due to the bulky cyclic structure, and furthermore has a small intermolecular mutual action due to the small amount of polar groups therein, which may provide such a nature that intermolecular slip is liable to occur. Accordingly, in the case where residual strain occurs in the transparent resin film containing a cyclic olefin resin that undergoes a stress in the film formation process (for example, a stress due to a tensile force applied), the molecules easily slip on each other with stimulation, such as heat, and thus the cyclic olefin resin tends to return to the stable (random) structure. Due to the mechanism, a difference in dimension may occur between the transparent resin film and the conductive layer positioned thereon, which may induce delamination between the transparent resin film and the conductive layer. In the case where the conductive layer is formed of a hydrophilic resin, in particular, the hydrophilic resin undergoes expansion and contraction due to the change in humidity, and thus adhesion failure due to the interlayer delamination between the transparent resin film and the conductive layer is further liable to occur.

In the invention, it has been found that the adhesion failure may be avoided by making the thermal dimensional change rate of the transparent resin film in hot water at 100° C. for 60 seconds within a range of from 0.01 to 0.2%. The thermal dimensional change rate in hot water at 100° C. for 60 seconds is 0.01% or more, preferably 0.02% or more, and more preferably 0.03% or more. The thermal dimensional change rate in hot water at 100° C. for 60 seconds is 0.2% or less, preferably 0.15% or less, and more preferably 0.1% or less. In the case where the thermal dimensional change rate in hot water at 100° C. for 60 seconds is in the range, the residual strain in the cyclic olefin may be reduced. Accordingly, the adhesion property between the conductive layer and the transparent resin film may be enhanced. Furthermore, the transparent resin film itself may be prevented from suffering interlayer delamination. When the thermal dimensional change rate in hot water at 100° C. for 60 seconds is less than 0.01%, the cyclic olefin molecules may be present in a curled structure due to the too small residual strain, and thus interlayer delamination and cleavage of the transparent resin film itself are liable to occur disadvantageously due to the too small intermolecular mutual action.

It may be generally estimated that a cyclic olefin resin is difficult to be affected by humidity due to the hydrophobicity thereof. In the invention, however, the measurement of the influence of humidity on a cyclic olefin resin is enabled by performing a heat treatment under a high temperature and high humidity environment for a short period of time. A hydrophilic resin is frequently used in an electrode layer, and in this case, i.e., the electrode layer is combined thereto, the heat treatment in hot water at 100° C. for 60 seconds may reproduce the influence of humidity applied from the electrode layer. Therefore, it is considered in the invention that the heat treatment in hot water at 100° C. for 60 seconds reproduces the contribution of water in the resin layer contained in the electrode layer combined with the cyclic olefin resin film, to the adhesion failure. The heat treatment in the invention may be performed for such a short period of time as 60 seconds since the heat treatment is performed under a high humidity environment. The heat treatment for such a short period of time may be sufficient since the thermal capacity is increased under a high humidity environment, and the amount of heat applied to the cyclic olefin resin film is liable to be increased as compared to a dry environment.

The thermal dimensional change rate in hot water at 100° C. for 60 seconds means the change rate of the dimension of the transparent conductive film that is immersed in hot water at 100° C. for 60 seconds. The dimensional change rate R may be calculated by the following expression.

$$R=(|L1-L2|/L1)\times 100$$

wherein L1 represents the dimension of the transparent conductive film before subjecting to the heat treatment in hot water at 100° C. for 60 seconds, and L2 represents the dimension of the transparent conductive film after subjecting to the heat treatment in hot water at 100° C. for 60 seconds. The dimension of the transparent conductive film may be obtained, for example, in such a manner that pin holes are formed with a distance of 10 cm, and the distance of the pins is measured with a pin gauge.

The thermal dimensional change rate in hot water at 100° C. for 60 seconds within the aforementioned range may be achieved by imparting slight thickness unevenness to the molten resin for forming the transparent resin film before solidification. Examples of the method for imparting the thickness unevenness to the molten resin include a method of imparting a distribution of from 1 to 20%, preferably from 2 to 15%, and more preferably from 3 to 10%, to the lip distance (gap) of the die lips. When the die lip distance has a distribution, the molten resin (melt) discharged therefrom may undergo thickness unevenness, and as a result, portions having different cooling rates may occur on cooling and solidifying the molten resin on a cast drum. Specifically, the cooling rate in the thick portion may be decreased, whereas the cooling rate in the thin portion may be increased. While the molten resin undergoes volume contraction on quenching on the cast drum, the cooling contraction may be absorbed by the soft portion present in the melt, thereby reducing the residual strain.

In general, a molten resin is extruded while preventing thickness unevenness from occurring, and thus the die lip distance is generally constant. The thermal dimensional change rate in hot water at 100° C. for 60 seconds of the transparent resin film that is extruded from the die having a constant lip distance is generally 0.3% or more, and is often 1% or more.

The variation of the distance of the die lips may be achieved in such a manner that bolts are provided on the die lips with constant distances (for example, from 10 to 20 equally divided positions), and the bolts are tightened or loosened. For the distance of the die lips, the bolts positioned on the edge portions may be tightened to make the edge portions of the film thick, or the bolts positioned on the center portion may be tightened to make the center portion of the film thick. Furthermore, the bolts may be tightened alternately one by one from the bolt on one of the edge portions to form plural uneven shapes in the molten resin.

The thickness unevenness imparted to the molten resin may be removed by making the thus-formed film into contact with a heat roll after the cast drum. The thickness unevenness may be elicited as irregularity on the surface of the film opposite to the surface that is in contact with the cast drum, and therefore the surface having the irregularly may be smoothened by making the surface into contact with a heat roll. The temperature of the heat roll used herein is preferably from Tg of the film to Tg−30° C., more preferably from Tg−1° C. to Tg−28° C., and further preferably from Tg−2° C. to Tg−25° C. The conveying tension is preferably from 50 to 200 N/m, more preferably from 60 to 180 N/m, and further preferably from 70 to 160 N/m. The film is conveyed preferably at a wrap angle of from 60 to 180°, more preferably from 65 to 175°, and further preferably from 70 to 170°. The winding tension is preferably from 50 to 200 N/m, more preferably from 50 to 200 N/m, and further preferably from 50 to 200 N/m. The thickness may be remedied by leaving the wound film at room temperature for 30 days or more. The heat treatment is performed at a temperature lower than Tg of the film, and thus the increase of the free volume of the molten resin due to melting may not occur, but only the thickness may be remedied.

The thickness unevenness imparted to the molten resin may be removed by making the film into contact with a heat roll under the aforementioned condition. According to the procedure, the thickness unevenness of the transparent resin film may be reduced, and the adhesion property to the conductive layer may be enhanced.

The thermal dimensional change rate in hot water at 100° C. for 60 seconds within the aforementioned range may also be achieved by imparting concentration unevenness to the molten resin for forming the transparent resin film before solidification. The concentration unevenness, i.e., the density unevenness of the resin, may be achieved by imparting thickness unevenness to the molten resin discharged from the die. It is considered that this is because of the following mechanism. While the molten resin is solidified on the cast drum, the molten resin is solidified with a low density maintained in the case where the molten resin is quenched, and thus the concentration of the film thus formed is low. Thus, the density is low in the portion having a small thickness of the molten resin. On the other hand, in the portion having a large thickness of the molten resin, the molten resin is gradually cooled, during which the density thereof is gradually increased, and thereby a portion having a large density is formed. The thickness unevenness of the molten resin in this case is preferably from 1 to 20%, more preferably from 2 to 15%, and further preferably from 3 to 10%. The thickness unevenness may be imparted by controlling the die lip distance as described above.

When the thermal dimensional change rate in hot water at 100° C. for 60 seconds is in the range, not only the residual strain may be removed, but also the free volume of the cyclic olefin resin in the molten resin may be reduced. The reduction of the free volume of the cyclic olefin resin may effectively suppress the dimensional change of the transparent resin film.

In general, a cyclic olefin resin in a molten state has a large free volume. The contraction of the free volume may not follow the cooling rate on quenching the resin on a cast drum for solidification, and thus the resin is solidified with the large free volume maintained. The cyclic olefin resin having a large free volume may facilitate the formation of residual strain in the transparent film. In the invention, however, the free volume may be suppressed small by imparting thickness unevenness to the molten resin. This may be caused by such a mechanism that the molten resin in the portion having a large thickness tends to have a small free volume, whereas the molten resin in the portion having a small thickness tends to have an increased free volume, and the presence of the thick portion may suppress the increase of the free volume in the thin portion. According to the mechanism, the free volume of the entire transparent resin film may be suppressed small. The suppression of the free volume may prevent the movement of the cyclic olefin molecules to reduce the residual strain, and thus the adhesion property between the transparent resin film and the conductive layer may be enhanced.

The reduction of the free volume may also have an effect of preventing water molecules from invading thereinto, which may be effective for suppressing the thermal dimensional change rate in hot water at 100° C. for 60 seconds.

In the invention, the in-plane variation in the thermal dimensional change rate in hot water at 100° C. for 60 seconds is preferably from 1 to 10%. The in-plane variation in the thermal dimensional change rate in hot water at 100° C. for 60 seconds is preferably 1% or more, more preferably 1.5% or more, and further preferably 2% or more. The in-plane variation is preferably 10% or less, more preferably 9% or less, and further preferably 8% or less.

The in-plane variation referred herein means that the film has a distribution of the thermal dimensional change rate in the in-plane direction along the surface of the film. In other words, this means that the unit regions of the film, which are formed by dividing equally the film in both the longitudinal direction and the transverse direction thereof, have thermal dimensional change rates in hot water at 100° C. for 60 seconds that are different from each other. In the case of a film having a length of less than 3 m in the longitudinal direction, for example, the film is divided into 100 pieces by dividing equally the center ⅔ region in the longitudinal direction into 10 pieces and dividing equally the center ⅔ region in the transverse direction into 10 pieces, the 100 pieces each are measured for the thermal dimensional change rate in hot water at 100° C. for 60 seconds at the center portion thereof, the difference between the maximum value and the minimum value is divided by the average value, and the result is expressed in terms of percentage, which is designated as the in-plane variation in the thermal dimensional change rate. In the case of a film having a length of 3 m or more, for example, the film is divided into 100 pieces by dividing equally the film in the longitudinal direction into 10 pieces at 10 points in total including 5 points from an arbitrary point as the center point toward the upstream side of the film and 5 points from the center point toward the downstream side and dividing equally the center ⅔ region in the transverse direction into 10 pieces, the 100 pieces each are measured for the thermal dimensional change rate in hot water at 100° C. for 60 seconds at the center portion thereof, the difference between the maximum value and the minimum value is divided by the average value, and the result is expressed in terms of percentage, which is designated as the in-plane variation in the thermal dimensional change rate.

The in-plane variation in the thermal dimensional change rate provided may enhance the adhesion property between the transparent resin film and the conductive layer. This may be because the portions having a small thermal contraction, i.e., the portions having a large adhesion force, are scattered thereon and function as points enhancing the adhesion, and delamination over the entire film may be prevented thereby. In the invention, the in-plane variation in the thermal dimensional change rate in hot water at 100° C. for 60 seconds may be controlled within the aforementioned range, and thereby the adhesion property between the transparent resin film and the conductive layer may be effectively enhanced.

The in-plane variation in the thermal dimensional change rate may be achieved by imparting a temperature distribution of from 1 to 10° C. to a melt pipe for feeding the molten resin to the die in the step of feeding the molten resin to the die. The temperature distribution thus imparted to the melt pipe may impart the similar temperature distribution to the molten resin. This may be because the temperature distribution thus imparted may make the flow rate of the melt uneven, and thus a distribution may occur in the cooling rate on cooling and solidification after discharging from the die. Consequently, the in-plane variation in the thermal dimensional change rage may be imparted.

Specifically, the in-plane variation in the thermal dimensional change rate may be imparted by imparting a temperature modulation to the melt pipe for feeding the molten resin to the die. The temperature modulation may be imparted to the melt pipe in such a manner that two heaters are provided on each of the initial flow portion (the portion having a ⅓ length of the entire melt pipe from the side where the molten resin flows from the extruder into the melt pipe) and the end flow portion (the portion having a ⅓ length of the entire melt pipe from the side where the molten resin flows out through the outlet port) of the melt pipe, and the temperature of the initial flow portion on the side of the extruder and the temperature of the end flow portion on the side of the outlet port are differentiated from each other. The temperature distribution applied to the melt pipe is preferably from 1 to 10° C., more preferably from 1.5 to 9° C., and further preferably from 2 to 8° C. The temperature difference may be the difference between the maximum temperature and the minimum temperature of the molten resin between the extruder and the die.

A distribution in the thermal dimensional change rate in the longitudinal direction may also be imparted by the temperature distribution on the melt pipe. The distribution in the thermal dimensional change rate in the transverse direction may be imparted by controlling the lip distance of the die, and therefore the variation in the thermal dimensional change rate may be imparted in both the longitudinal direction and the transverse direction by combining the methods described above, thereby enhancing the adhesion property between the transparent resin film and the conductive layer further efficiently.

In the invention, the transparent conductive film preferably has a dielectric constant change rate in a temperature range of from −20 to 30° C. of from 0.1 to 10%. The dielectric constant change rate of the transparent conductive film is preferably 0.1% or more, more preferably 0.3% or more, and further preferably 0.5% or more. The dielectric constant change rate of the transparent conductive film is preferably 10% or less, more preferably 8% or less, and further preferably 7% or less. The dielectric constant change rate herein is a dielectric constant change rate that is in a temperature range of from −20 to 30° C., and in the invention, the dielectric constant change rate is preferably in the aforementioned range over the entire temperature range of from −20 to 30° C., and thus the temperature dependency of the change in the dielectric constant is preferably small.

A large change in the dielectric constant means an increased difference in mobility among the molecules on the surface of the film. In this case, accordingly, the adhesion state may be largely changed in a cycle test between a high temperature and a low temperature, and thereby adhesion failure may occur. In the invention, the temperature dependency of the dielectric constant is reduced, and thereby the adhesion failure between the transparent resin film and the conductive layer may be suppressed from occurring. Thus, even after a cycle test, in the invention, the dielectric constant change rate is preferably in the aforementioned range, and thereby the adhesion failure may be suppressed from occurring even under cyclic thermal stress (severe condition).

For achieving the dielectric constant change rate that is within the aforementioned range, it is necessary to lower the change in mobility of molecules associated with the temperature, and it is effective therefor to make the temperature of the resin (pellets) placed in the extruder within a range of from Tg−80° C. to Tg. The temperature of the resin (pellets) placed in the extruder is more preferably Tg−70° C. to Tg−5° C., and further preferably from Tg−60° C. to Tg−10° C. The temperature of the resin (pellets) placed in the extruder is preferably within the range, and thereby dielectric constant change rate in a temperature range of from −20 to 30° C. may be in the aforementioned range.

In the case where the temperature of the resin (pellets) placed in the extruder is in the aforementioned range, the resin (pellets) in a somewhat soft state may be fed to the extruder. Accordingly, the unmelted pellets are prevented from being frictioned with each other in the inlet port of the extruder, and thereby the resin is prevented from being decomposed to lower the molecular weight due to the shearing force and the frictional heat caused thereby. In the case where the low molecular weight component is contained in the resin, the mobility of the molten resin may be increased to increase the dielectric constant change rate, and thus in the invention, the dielectric constant change rate within the aforementioned range may be achieved by preventing the low molecular weight component from being formed.

In the invention, the in-plane variation in the dielectric constant change rate in a temperature range of from −20 to 30° C. is preferably from 1 to 10%. The in-plane variation in the dielectric constant change rate is preferably 1% or more, more preferably 1.5% or more, and further preferably 2% or more. The in-plane variation in the dielectric constant change rate is preferably 10% or less, more preferably 9% or less, and further preferably 8% or less. In the case where the in-plane variation in the dielectric constant change rate is in the range, the adhesion property between the transparent resin film and the conductive layer may be further enhanced. It is considered that this is because in the case where portions having a small dielectric constant change rate and thus having high adhesion property are locally present, the adhesion force is liable to be increased with the portions as the adhesion sites, as compared to the case where the dielectric constant change rate is uniform over the surface of the film.

The distribution in the dielectric constant change rate may be achieved by imparting an in-plane distribution to the low molecular weight component formed through thermal decomposition, and thus may be achieved by imparting a modulation to an inert gas placed into the extruder. The modulation amount is preferably from 0.5 to 10%, more preferably from 1 to 8%, and further preferably from 1.5 to 7%. In the case where the modulation amount of the inert gas is in the range, the in-plane variation in the dielectric constant change rate in a temperature range of from −20 to 30° C. may be controlled to the desired range.

The inert gas may prevent the resin from being thermally decomposed. Accordingly, by imparting a modulation to the flow amount thereof, a modulation may be imparted to the amount of the thermal decomposition product (i.e., the low molecular weight component) formed. Examples of the inert gas include nitrogen and a rare gas (such as Ar, He and Ne). The modulation in the flow rate of the inert gas may be achieved, for example, by providing a motor to the valve controlling the gas feed, and closing and opening the valve appropriately. The modulation amount of the inert gas herein means a value in terms of percentage obtained by dividing the difference between the maximum flow amount and the minimum flow amount by the average flow amount while monitoring the flow rate for 10 minutes. The average flow rate of the inert gas is preferably from V×0.1 to V×10, wherein V represents the fed volume of the resin to the extruder per unit period of time.

In the invention, the transparent conductive film preferably has an in-plane birefringence (Re) of from 1 to 20 nm and a birefringence in the thickness direction (Rth) of from 1 to 20 nm. The in-plane birefringence (Re) and the birefringence in the thickness direction (Rth) each are preferably 1 nm or more, more preferably 2 nm or more, and further preferably 3 nm or more. The in-plane birefringence (Re) and the birefringence in the thickness direction (Rth) each are preferably 20 nm or less, more preferably 18 nm or less, and further preferably 15 nm or less.

The in-plane birefringence (Re) herein shows the in-plane orientation, and by reducing Re, the elongation (tension) of the resin molecules may be reduced to reduce the brittleness, which may consequently provide such an effect that the resin in the film may be prevented from being broken on evaluation of the adhesion property, thereby improving the adhesion property. In the case where Re is too small, it is not preferred since the molecules each may be curled into a yarn ball form respectively, which prevents the intermolecular mutual action from being formed, and thus the brittleness tends to be increased.

The birefringence in the thickness direction (Rth) shows the orientation in the thickness direction, and by reducing Rth, the molecules may be prevented from being oriented in a lamellar form, and thereby the film may be prevented from suffering adhesion failure due to cleavage thereof into a lamellar form, on evaluation of the adhesion property. In the case where Rth is too small, it is not preferred since the molecules each may be curled into a yarn ball form respectively, which prevents the intermolecular mutual action from being formed, and thus the brittleness tends to be increased.

In the invention, by reducing Re and Rth while maintaining the small free volume, the adhesion property between the transparent resin film and the conductive layer may be enhanced, and furthermore the transparent resin film itself may be prevented from suffering interlayer delamination and cleavage.

For reducing Re and Rth, it is an ordinary measure that a resin in a molten state (i.e., in a random state without orientation) is solidified by quenching while maintaining the non-orientation state. However, the measure solidifies the resin while maintaining the molten state having a large free volume, and thus is unable to produce the film having a small free volume as described above. Accordingly, as a method for producing a film having a small free volume and also having small Re and Rth, such a method may be exemplified that a molten resin (melt) is extruded from a die and then applied with vibration in the air gap between the die and the cast drum. According to the procedure, the molecules are applied with vibration to enhance the molecular packing, and thus the free volume may be reduced. Furthermore, the molecular orientation may be disturbed by the vibration, and thus Re and Rth are reduced. The vibration is effectively applied at a temperature around the time when the molecules are solidified (e.g., Tg±20° C.). In the case where the temperature is too high, the free volume may not be reduced due to the large thermal motion of the molecules, and in the case where the temperature is too low, the free volume may not be reduced due to the too low mobility of the molecules. The temperature may be achieved immediately before the melt is in contact with the cast drum, and thus the vibration may be effectively applied to the melt in this region.

The vibration may be applied to the melt in the air gap by any measure, and for example, an air blow having a wind speed variation may be applied to the melt, and a cast drum having a rotation speed variation may be used. The rotation speed variation may be achieved by applying a variation to the rotation number of the cast drum per one minute, and the variation of the rotation number is preferably from 10 to 300 rpm, more preferably from 20 to 250 rpm, and further preferably from 30 to 200 rpm. When the variation of the rotation number is in the range, Re and Rth may be controlled to the desired ranges.

For solidifying the melt immediately above the cast drum, the temperature of the cast drum is preferably from Tg−60° C. to Tg+20° C., more preferably from Tg−50° C. to Tg+10° C., and further preferably from Tg−45° C. to Tg. The temperature of the cast drum may be controlled by flowing a heat medium (such as an oil or water) inside the cast drum. When the temperature of the cast drum is in the range, Re and Rth may be controlled to the desired ranges.

In the invention, the transparent conductive film preferably has an in-plane variation in the in-plane birefringence (Re) of from 1 to 10% and an in-plane variation in the birefringence in the thickness direction (Rth) of from 1 to 10%. The in-plane variation in the in-plane birefringence (Re) and the in-plane variation in the birefringence in the thickness direction (Rth) each are preferably 1% or more, more preferably 1.5% or more, and further preferably 2% or more. The in-plane variation in the in-plane birefringence (Re) and the in-plane variation in the birefringence in the thickness direction (Rth) each are preferably 10% or less, more preferably 9% or less, and further preferably 8% or less. In the case where the in-plane variation in the in-plane birefringence (Re) and the in-plane variation in the birefringence in the thickness direction (Rth) are in the ranges, the adhesion property between the transparent resin film and the conductive layer may be enhanced, and furthermore the transparent resin film itself may be prevented from suffering interlayer delamination and cleavage. This may be because portions having small Re and Rth and thus having high adhesion property are locally present, and the adhesion force is liable to be increased with the portions as the adhesion sites.

The distributions of Re and Rth may be achieved by imparting a temperature distribution to the cast drum to vary the cooling solidification speed of the molten resin. The temperature distribution of the cast drum is preferably from 0.5 to 10° C., more preferably from 1 to 8° C., and further preferably from 1.5 to 7° C. The temperature distribution may be achieved by forming unevenness in the flow of the heat medium inside the cast drum, and specifically may be achieved, for example, by providing a baffle plate inside the cooling roll for disturbing the flow path.

In the invention, the transparent resin film preferably has a thickness of from 20 to 60 μm. The thickness of the transparent resin film is preferably 20 μm or more, more preferably 25 μm or more, and further preferably 30 μm or more. The thickness of the transparent resin film is preferably 60 μm or less, more preferably 55 μm or less, and further preferably 50 μm or less. In the case where the thickness of the transparent resin film is in the range, the remedy of the thickness unevenness applied to the molten resin may be facilitated, and thereby the adhesion property between the transparent resin film and the conductive layer may be enhanced.

In general, in the case where the thickness of the transparent resin film is in such a small range as described above, Re and Rth tend to be large. The increase of Re and Rth may be suppressed by applying a variation to the rotation speed of the heat roll provided subsequent to the cast roll, and the variation is preferably from 0.1 to 5%, more preferably from 0.2 to 4%, and further preferably from 0.3 to 3%. This may be because by controlling the rotation speed of the roll to the aforementioned range, the tension applied to the film being released from the roll may be varied, and a tension in the direction perpendicular to the film plane is also applied thereto, which facilitates the release of the film from the roll, thereby suppressing the increase of Re and Rth due to the tension on releasing the film. Thus, by controlling the rotation speed of the heat roll to the aforementioned range, Re and Rth may be suppressed from being increased. The variation in the rotation speed herein means a value expressed in terms of percentage that is obtained by dividing the difference between the maximum value and the minimum value of the rotation speed measured for one minute by the average value thereof.

2. Transparent Resin Film 2-1. Resins Contained in Transparent Resin Film

The transparent conductive film of the invention contains a transparent resin film, and the transparent resin film contains a cyclic olefin resin. Examples of the cyclic olefin resin include an addition polymerization cycloolefin resin (COC) and a ring-opening polymerization cycloolefin resin (COP). The resin may be used solely or as a mixture thereof. The cyclic olefin resin preferably has Tg of from 100 to 200° C., more preferably from 120 to 190° C., and further preferably from 125 to 185° C. The cyclic olefin resin thus polymerized is preferably used after forming into pellets.

Examples of the ring-opening polymerization cycloolefin resin (COP) used include the resins described in paragraphs [0032] to [0069] of JP-A-2010-164538 and the resins described in paragraphs [0016] to [0022] of Japanese Patent No. 4,492,116.

Examples of the addition polymerization cycloolefin resin (COC) include the resins described in paragraphs [0014] to [0060] of Japanese Patent No. 3,723,616, the resins described in paragraphs [0015] to [0062] of Japanese Patent No. 3,683,631, the resin described in paragraphs [0008] to [0093] of Japanese Patent No. 3,377,833.

2-2. Additives Contained in Transparent Resin Film

The COC and COP preferably contain a heat stabilizer (antioxidant), an ultraviolet ray absorbent, a dye, and the like. These additives may be placed in an extruder along with the COC or COP pellets and then formed into a film, or may be mixed with the COC or COP pellets to form master pellets in advance, and then the master pellets may be placed in an extruder and formed into a film.

Examples of the heat stabilizer used include the compounds described in paragraphs [0045] and [0046] of JP-A-2012-229405 and the compounds described in paragraphs [0071] and [0072] of Japanese Patent No. 3,723,616.

Examples of the ultraviolet ray absorbent used include the compounds described in paragraph [0034] of Japanese Patent No. 4,729,802 and the compounds described in paragraph [0101] of Japanese Patent No. 3,377,833. Examples of the other additives used include the compounds described in paragraphs [0025] and [0026] of Japanese Patent No. 4,492,116.

3. Conductive Layer

The transparent conductive film of the invention contains a conductive layer. The conductive layer is formed in a layer form, and is preferably formed to have an intermittent portion. The intermittent portion means a portion where the conductive layer is not provided, and the intermittent portion is preferably surrounded by the conductive layer. In the invention, the formation of the conductive layer having an intermittent portion may be referred to as the formation of the conductive layer in a patterned shape or a mesh shape.

FIG. 1(a) is a schematic cross sectional view showing an embodiment of the transparent conductive film 10 of the invention. As shown in FIG. 1(a), the transparent conductive film 10 of the invention has a transparent resin film 12 and a conductive layer 14. The conductive layer 14 may be formed partially as shown in FIG. 1(a), or may be formed in a layer form that covers the entire surface of the transparent resin film.

FIG. 1(b) is a schematic plane view showing an embodiment of the transparent conductive film 10 of the invention. As shown in FIG. 1(b), the transparent conductive film 10 preferably has an intermittent portion 20. The intermittent portion 20 is a portion where the conductive layer 14 is not formed, and in the case where the transparent resin film 12 and the conductive layer 14 are laminated and are in contact with each other, the transparent resin film 12 is exposed in the intermittent portion 20.

In the invention, the conductive layer is preferably formed in a patterned shape or a mesh shape. Examples of the conductive layer include the conductive layers shown in JP-A-2013-1009, JP-A-2012-216550, JP-A-2012-151095, JP-A-2012-25158, JP-A-2011-253546, JP-A-2011-197754, JP-A-2011-34806, JP-A-2010-198799, JP-A-2009-277466, JP-A-2012-216550, JP-A-2012-151095, WO 2010/140275 and WO 2010/114056.

3-1. Formation of Conductive Layer Containing Silver

The conductive layer used in the invention more preferably contains silver and a hydrophilic resin. Examples of the hydrophilic resin include gelatin, polyvinyl alcohol (PVA), polyvinylpyrrolidone (PVP), polysaccharide, such as starch, cellulose and derivatives thereof, polyethylene oxide, polyvinylamine, chitosan, polylysine, polyacrylic acid, polyalginic acid, polyhyaluronic acid and carboxycellulose. These compounds have neutral, anionic or cationic nature depending on the ionic property of the functional group. Among these, gelatin is particularly preferred.

In the conductive layer used in the invention, a silver halide photosensitive material is particularly preferably used. In the case where a silver halide photosensitive material is used, the method for producing the conductive layer includes the following three embodiments depending on the photosensitive material and the mode of development.

Embodiment (1)

A photosensitive silver halide monochromic photosensitive material containing no physical development nucleus is subjected to chemical development or thermal development to form a metallic silver part on the photosensitive material.

Embodiment (2)

A photosensitive silver halide monochromic photosensitive material containing physical development nuclei in a silver halide emulsion layer is subjected to dissolution physical development to form a metallic silver part on the photosensitive material.

Embodiment (3)

A photosensitive silver halide monochromic photosensitive material containing no physical development nucleus is laminated on an image receiving sheet having a non-photosensitive layer containing physical development nuclei to perform diffusion transfer development, and thereby a metallic silver part is formed on the non-photosensitive image receiving sheet.

In the embodiment (1), an integrated monochromic development type material is used, and a translucent conductive film, such as a light transmissive conductive film, is formed on the photosensitive material. The resulting developed silver is chemically developed silver or thermally developed silver, which has high activity in a subsequent plating or physical development process in the point that the developed silver is in the form of filaments having a large specific surface area.

In the embodiment (2), in the exposed portion, silver halide particles in the vicinity of the physical development nucleus are dissolved and precipitated on the development nucleus, and thus a translucent conductive film, such as a light transmissive conductive film, is formed on the photosensitive material. The material used in this embodiment is also an integrated monochromic development type material. The developed silver has high activity since the development is performed by deposition on the physical nucleus, but the developed silver is in the form of spheres having a small specific surface area.

In the embodiment (3), silver halide particles are dissolved in a non-exposed portion and are precipitated on the development nuclei in the image receiving sheet through diffusion, and thereby a translucent conductive film, such as a light transmissive conductive film, is formed on the image receiving sheet. The material used is a so-called separate type material, and the image receiving sheet is used after releasing from the photosensitive material.

In all the embodiments, anyone of a negative development process and a positive development process may be used. In the diffusion transfer method, a negative development process may be performed by using an autopositive photosensitive material as the photosensitive material.

The chemical development, the physical development, the dissolution physical development, and the diffusion transfer development referred herein each have the meaning that is ordinarily recognized in this field of art, and are described in general reference books for photographic chemistry, for example, S. Kikuchi, Shashin Kagaku (Photographic Chemistry), Kyoritsu Shuppan Co., Ltd. (1955) and C. E. K. Mees (ed.), The Theory of Photographic Processes, 4th ed., McMillan Publishing, Inc. (1977). While the invention may be performed by a liquid process, techniques using other development systems, for example, a thermal development system, may also be referred in the invention. For example, the techniques described in JP-A-2004-184693, JP-A-2004-334077, JP-A-2005-010752, and Japanese Patent Application Nos. 2004-244080 and 2004-085655 may be applied.

The structures of the layers constituting the conductive layers according to the embodiments of the invention will be described in detail below.

3-2. Silver Salt Emulsion Layer

The silver salt emulsion layer to be the conductive layer of the invention may contain, in addition to a silver salt and a binder, a solvent and an additive, such as a dye. Examples of the silver salt include an inorganic silver salt, such as a silver halide, and an organic silver salt, such as silver acetate. In the invention, a silver halide, which is excellent in characteristics as a photosensor, is preferably used.

The solvent used for forming the silver salt emulsion layer is not particularly limited, and examples thereof include water, an organic solvent (for example, an alcohol compound, such as methanol, a ketone compound, such as acetone, an amide compound, such as formamide, a sulfoxide compound, such as dimethylsulfoxide, an ester compound, such as ethyl acetate, and an ether compound), an ionic liquid, and mixed solvents thereof.

In the invention, the content of the solvent used in the silver salt emulsion layer may be in a range of from 30 to 90% by mass, and preferably in a range of from 50 to 80% by mass, based on the total mass of the silver salt, binder and the like contained in the silver salt emulsion layer.

The binder and the additives are not particularly limited, and known materials may be preferably used.

The coated silver amount (i.e., the amount of the silver salt coated) in the silver salt emulsion layer is preferably from 1 to 30 $g/m^2$, more preferably from 1 to 25 $g/m^2$, and further preferably from 5 to 20 $g/m^2$, in terms of silver. When the coated silver amount is in the range, the desired surface resistance may be obtained.

The content of the binder contained in the silver salt emulsion layer is not particularly limited, and may be appropriately determined in such a range that the binder may exhibit dispersibility and adhesiveness. The content of the binder in the silver salt emulsion layer in terms of silver/binder volume ratio is preferably ¼ or more, and more preferably ½ or more. The silver/binder volume ratio is preferably 100/1 or less, and more preferably 50/1 or less. The silver/binder volume ratio is further preferably from 1/1 to 4/1, and most preferably from 1/1 to 3/1. When the silver/binder volume ratio in the silver salt emulsion layer is in the range, the fluctuation in the resistance may be suppressed even in the case where the coated silver amount is adjusted, and thereby the conductive layer that has a uniform surface resistance may be obtained. The conductive layer that has a uniform surface resistance may be favorably used for a touch panel.

The silver/binder volume ratio may be obtained in such a manner that the weight ratio of silver halide/binder in the raw materials is converted to the weight of silver/binder, and the weight of silver/binder is converted to the volume ratio of silver/binder.

4. Structures of Other Layers

A protective layer may be provided on the silver salt emulsion layer. The protective layer in the invention means a layer formed of a binder, such as gelatin and a polymer, and may be formed on the silver salt emulsion layer having photosensitivity, for achieving such effects as scratch resistance and improvement of physical properties. The thickness of the protective layer is preferably 0.5 μm or less. The coating method and the formation method of the protective layer are not particularly limited, and the known coating methods and formation methods may be appropriately used. For the protective layer, for example, reference may be made to JP-A-2008-250233 and the like.

Other functional layers including an undercoating layer and an antistatic layer may be provided in the invention. Examples of the undercoating layer used include the undercoating layers described in paragraphs [0021] to [0023] of JP-A-2008-250233. Examples of the antistatic layer used include the antistatic layers described in paragraphs [0012] and [0014] to [0020] of JP-A-2008-250233.

5. Method for Producing Transparent Conductive Film

The method for producing a transparent conductive film of the invention contains a step of forming a transparent resin film containing a cyclic olefin resin, and a step of forming a conductive layer on the transparent resin film. The step of forming the transparent resin film contains an extrusion step of forming a molten resin containing a cyclic olefin resin into a sheet, and the extrusion step contains a step of imparting thickness unevenness to the molten resin in the form of a sheet.

5-1. Formation of Transparent Resin Film 5-1-1. Extrusion

The transparent resin film used in the invention is preferably formed in the following manner.

The pellets of the cyclic olefin resin described above (COC or COP pellets) or the master pellets are dried to a water content of 100 ppm or less. The pellets are then placed in an extruder and kneaded. The resin (pellets) placed in the extruder preferably has a temperature that is controlled to a range of from Tg–80° C. to Tg. The temperature of the resin (pellets) placed in the extruder is more preferably from Tg–70° C. to Tg–5° C., and further preferably from Tg–60° C. to Tg–10° C. When the temperature of the resin (pellets) placed in the extruder is in the range, the dielectric constant change rage in a temperature range of from –20 to 30° C. may be in the desired range.

After heating the pellets as described above, the pellets are placed in a hopper of the extruder. The extruder used may be a single screw extruder or a twin screw extruder, and the extrusion temperature is preferably from 250 to 330° C., and more preferably from 260 to 315° C.

An inert gas is preferably fed to the extruder, and the flow rate of the extruder is preferably imparted with a variation. The variation amount is preferably from 0.5 to 10%, more preferably from 1 to 8%, and further preferably from 1.5 to 7%. When the variation imparted to the flow rate of the inert gas is in the range, the dielectric constant change rage in a temperature range of from −20 to 30° C. may be in the desired range. Examples of the inert gas used include nitrogen and a rare gas (such as Ar, He and Ne).

The molten resin (melt) thus kneaded and melted in the extruder is fed to a die through a melt pipe. The melt pipe is preferably imparted with a temperature distribution of from 1 to 10° C. This is because the temperature distribution imparted may make the flow rate of the melt uneven, and thus a distribution may occur in the cooling rate on cooling and solidification after discharging from the die. Consequently, the in-plane variation in the thermal dimensional change rage may be imparted. The temperature modulation may be imparted to the melt pipe in such a manner that two heaters are provided on each of the initial flow portion (the portion having a ⅓ length of the entire melt pipe from the side where the molten resin flows from the extruder into the melt pipe) and the end flow portion (the portion having a ⅓ length of the entire melt pipe from the side where the molten resin flows out through the outlet port) of the melt pipe, and the temperature of the initial flow portion on the side of the extruder and the temperature of the end flow portion on the side of the outlet port are differentiated from each other. The temperature distribution applied to the melt pipe is preferably from 1 to 10° C., more preferably from 1.5 to 9° C., and further preferably from 2 to 8° C. The temperature difference may be the difference between the maximum temperature and the minimum temperature of the molten resin between the extruder and the die.

The extruder is preferably equipped with a gear pump and a melt filter. The melt filter preferably has a pore diameter of from 1 to 30 μm, more preferably from 2 to 20 μm, and further preferably from 3 to 10 μm. The die used may be a T-die, a coat hanger die, a fish tail die, and the like. A co-extrusion method may also be preferably used, and a multi-manifold die, a feed block die, and the like may be used therefor.

In the extrusion, the lip distance (gap) of the die lips is preferably imparted with a distribution of from 1 to 20%, preferably from 2 to 15%, and more preferably from 3 to 10%. The distribution imparted to the die lip distance may form thickness unevenness in the molten resin (melt) discharged therefrom.

5-1-2. Cast

The melt thus extruded from the die is solidified on a cast drum (which may also be referred to as a cooling drum or a chill roll). In the air gap between the die and the cast drum, a vibration of from 10 to 300 per minute is preferably imparted to the molten resin in the sheet form. According to the procedure, the molecules are applied with vibration to enhance the molecular packing, and thus the free volume may be reduced. Furthermore, the molecular orientation may be disturbed by the vibration, and thus Re and Rth are reduced. The vibration may be applied to the melt in the air gap by any measure, and for example, an air blow having a wind speed variation may be applied to the melt, and a cast drum having a rotation speed variation may be used. The rotation speed variation may be achieved by applying a variation to the rotation number of the cast drum per one minute, and the variation of the rotation number is preferably from 10 to 300 rpm, more preferably from 20 to 250 rpm, and further preferably from 30 to 200 rpm. When the variation of the rotation number is in the range, Re and Rth may be controlled to the desired ranges.

The cast drum is preferably imparted with a temperature distribution. The temperature distribution is preferably from 0.5 to 10° C., more preferably from 1 to 8° C., and further preferably from 1.5 to 7° C. The temperature distribution may be achieved by forming unevenness in the flow of the heat medium inside the cast drum, and specifically may be achieved, for example, by providing a baffle plate inside the cooling roll for disturbing the flow path.

The resin film thus solidified on the cast drum is preferably passed through a heat roll. The thickness unevenness imparted to the molten resin may be removed by making the thus-formed film into contact with a heat roll after the cast drum. The temperature of the heat roll used herein is preferably from Tg of the film to Tg−30° C., more preferably from Tg−1° C. to Tg−28° C., and further preferably from Tg−2° C. to Tg−25° C. The conveying tension is preferably from 50 to 200 N/m, more preferably from 60 to 180 N/m, and further preferably from 70 to 160 N/m. The film is conveyed preferably at a wrap angle of from 60 to 180°, more preferably from 65 to 175°, and further preferably from 70 to 170°. The winding tension is preferably from 50 to 200 N/m, more preferably from 50 to 200 N/m, and further preferably from 50 to 200 N/m. The rotation speed of the heat roll is preferably imparted with a variation of from 0.1 to 5%, more preferably from 0.2 to 4%, and further preferably from 0.3 to 3%, and thereby the increase of Re and Rth may be suppressed.

After winding, both edges of the film are preferably subjected to thickening or trimming. The film is also preferably adhered to a lamination film, and a film of polyolefin, polyester or the like having a thickness of from 10 to 100 μm may be used as the lamination film. The winding width is preferably from 0.5 to 3 m, more preferably from 1 to 2.5 m, and further preferably from 1.2 to 2.2 m, and the winding length is preferably from 1,000 to 15,000 m, more preferably from 2,000 to 12,000 m, and further preferably from 3,000 to 10,000 m.

5-2. Formation of Conductive Layer 5-2-1. Exposure

In the invention, the conductive layer used is preferably a patterned conductive layer, and the method for forming the patterned conductive layer includes a printing method, and is preferably, in addition to the printing method, a method of forming a transparent conductive pattern through exposure, development and the like. Specifically, a photosensitive material containing the transparent resin film having provided thereon a silver salt-containing layer or a photosensitive material containing the transparent resin film having coated thereon a photopolymer for photolithography is exposed. The exposure may be performed with an electromagnetic ray. Examples of the electromagnetic ray include light, such as visible light and ultraviolet light, and a radiation, such as an X-ray. The exposure may also be performed with a light source having a wavelength distribution or a light source having a particular wavelength.

5-2-2. Development Treatment

The silver salt-containing layer is exposed and then developed. The development treatment used may be performed by the ordinary technique of development, for example, those used for a silver salt photographic film or paper, a film for photomechanical process, an emulsion musk for photomask, and the like. While the developer solution is not particularly limited, a PQ developer, an MQ developer, an MAA developer and the like may be used, and examples of commercially available products of the developer solution include NC-16, CR-56, CP45X, FD-3, Papitol, and the like, which are the formulations available from Fujifilm Corporation, C-41, E-6, RA-4, D-19, D-72, which are the formulations available from Eastman Kodak Corporation, and the developer solutions included in the kits thereof. A lith developer solution may also be used.

The development treatment in the invention may include a fixing treatment that is performed for removing the silver salt in the non-exposed portion for stabilization. The fixing treatment used in the invention may be the ordinary techniques for the fixing treatment used for a silver salt photographic film or paper, a film for photomechanical process, an emulsion musk for photomask, and the like.

The fixing temperature in the fixing treatment is preferably from approximately 20° C. to approximately 50° C., and more preferably from 25 to 45° C. The fixing time is preferably from 5 seconds to 1 minute, and more preferably from 7 to 50 seconds. The replenishing amount of the fixing solution is preferably 600 mL/m$^2$ or less, more preferably 500 mL/m$^2$ or less, and particularly preferably 300 mL/m$^2$ or less, based on the processing amount of the photosensitive material.

The photosensitive material having been subjected to the development and fixing treatments is preferably subjected to a water rinsing treatment and a stabilization treatment. The water rinsing treatment and the stabilization treatment may be generally performed with an amount of rinsing water of 20 L or less per 1 m$^2$ of the photosensitive material, and may be performed with a replenishing amount of 3 L or less (which may be 0 L, i.e., rinsing with reservoir water).

The mass of metallic silver contained in the exposed portion after the development treatment is preferably 50% by mass or more, and more preferably 80% by mass or more, of the mass of silver contained in the exposed portion before exposure. In the case where the mass of metallic silver contained in the exposed portion is 50% by mass of the mass of silver contained in the exposed portion before exposure, it is preferred since a high conductivity may be obtained.

The gradient after the development treatment in this embodiment is not particularly limited and preferably exceeds 4.0. When the gradient after the development treatment exceeds 4.0, the conductivity in the conductive metal part may be enhanced while maintaining the translucency of the translucent part. Examples of the measure for making a gradient exceeding 4.0 include doping with rhodium ions or iridium ions.

The conductive layer may be obtained through the aforementioned procedures, and the surface resistance of the resulting conductive layer is preferably in a range of from 0.1 to 100 Ω/sq., and more preferably in a range of from 1 to 10 Ω/sq. The conductive layer after the development treatment may be subjected to a calendering treatment, and the surface resistance may be controlled to a desired value by the calendering treatment.

5-2-3. Physical Development and Plating Treatments

In the invention, for enhancing the conductivity of the metallic silver part formed through the exposure and development treatments, a physical development treatment and/or a plating treatment may be performed for supporting conductive metal particles on the conductive layer. In the invention, conductive metal particles may be supported on the metallic silver part by any one of the physical development treatment and the plating treatment, or conductive metal particles may be supported on the metallic silver part by the combination of the physical development treatment and the plating treatment. In the description herein, the metallic silver part that has been subjected to the physical development treatment and/or the plating treatment may be inclusively referred to as a conductive metal part. The conductive metal part that is formed on the transparent resin film may be referred to as a conductive layer.

The physical development referred herein is such a procedure that metal particles are deposited on a metal or a metal compound through reduction of a metal ion, such as a silver ion, with a reducing agent. The physical development is utilized in an instant black-and-white film, an instant reversal film, a photomechanical process, and the like, and the techniques thereof may be used in the invention. The physical development may be performed simultaneously with the development treatment after exposure or may be performed separately after the development treatment.

The plating treatment used may be any one of electroless plating (such as chemical reduction plating and immersion plating) and electrolytic plating, or both electroless plating and electrolytic plating. The electroless plating in this embodiment may be performed by the known electroless plating techniques, and for example, the electroless plating techniques used in a printed circuit board and the like may be used. The electroless plating used is preferably electroless copper plating.

5-2-4. Oxidation Treatment

The metallic silver part after the development treatment and the conductive metal part that is formed through the physical development and/or the plating treatment are preferably subjected to an oxidation treatment. In the case where a metal is slightly deposited on the translucent part, for example, the oxidation treatment performed may remove the metal to make the transmittance of the translucent part be substantially 100%.

5-2-5. Conductive Metal Part

The conductive metal part in the invention is preferably formed into a patterned shape or a mesh shape to have an intermittent portion. Accordingly, the line width of the conductive metal part is preferably selected from a range of from 5 to 200 μm (0.2 mm), and in the case of the application to a touch panel, the line width is preferably from 5 to 50 μm. The line width is more preferably from 5 to 30 μm, and most preferably from 5 to 20 μm. The line distance is preferably from 30 to 500 μm, more preferably from 50 to 400 μm, and most preferably from 100 to 350 μm. The conductive metal part may have a portion having a line width exceeding 200 μm, for example, for the purpose of grounding or the like.

The conductive metal part in this embodiment preferably has an aperture ratio of 85% or more, more preferably 90% or more, and most preferably 95% or more, from the standpoint of the visible light transmittance. The aperture ratio may be expressed as a proportion of the area of the intermittent portion with respect to the total area where the conductive metal part (i.e., the area of the transparent resin film).

5-2-6. Translucent Part

The translucent part in this embodiment means a part that has translucency, which is other than the conductive metal part, on the transparent conductive film. The transmittance in the translucent part may be 90% or more, preferably 95% or more, more preferably 97% or more, further preferably 98% or more, and most preferably 99% or more, in terms of the minimum value of transmittance in a wavelength range of from 380 to 780 nm except for the contribution of the light absorption and reflection of the transparent resin film.

The exposing method is preferably a method using a glass mask and a pattern exposure method by laser drawing.

The thickness of the conductive metal part (conductive layer) provided on the transparent resin film may be appropriately determined by the coating thickness of the coating composition for the silver salt-containing layer coated on the transparent resin film. The thickness of the conductive metal part (conductive layer) may be selected from a range of from 0.001 to 0.2 mm, and is preferably 30 μm or less, more preferably 20 μm or less, further preferably from 0.01 to 9 μm, and most preferably from 0.05 to 5 μm. It is preferable that the metallic silver part has a patterned shape. The conductive metal part may contain only one layer or may have a multilayer structure containing two or more layers. In the case where the conductive metal part has a patterned shape and has a multilayer structure containing two or more layers, the layers may have different color sensitivities for providing sensitivities to different wavelengths. According to the structure, the layers may have different patterns through exposure with light having different wavelengths.

In the application to a touch panel, the thickness of the conductive metal part is preferably as thin as possible for enhancing the viewing angle, and the thickness is also demanded to be reduced from the standpoint of the enhancement of the visibility. In this point of view, the thickness of the layer formed on a conductive metal supported on the conductive metal part is preferably less than 9 μm, more preferably from 0.1 to 5 μm, and further preferably from 0.1 to 3 μm.

In this embodiment, the metallic silver part having the desired thickness is formed by controlling the coating thickness of the silver salt-containing layer, and the thickness of the layer formed of the conductive metal particles may be freely controlled by the physical development and/or the plating treatment. Accordingly, the conductive metal part that has such a small thickness as less than 5 μm, and preferably less than 3 μm, may be easily formed.

In the production method of the transparent conductive film in this embodiment, the plating step or the like may not be necessarily performed. This is because in the production method of the transparent conductive film in this embodiment, the desired surface resistance may be obtained by controlling the coated silver amount and the silver/binder volume ratio of the silver salt emulsion layer. A calender treatment may be performed depending on necessity.

5-2-7. Film Hardening Treatment

The silver salt emulsion layer after subjecting to the development treatment is preferably subjected to a film hardening treatment by immersing in a film hardener. Examples of the film hardener include a dialdehyde compound, such as glutaraldehyde, adipoaldehyde and 2,3-dihydroxy-1,4-dioxane, boric acid, and the like, which are described in JP-A-2-141278.

The invention may be used in combination with the techniques described in the patent documents including the Japanese published unexamined patent applications shown in Table 1 and the international publications shown in Table 2. In the Tables 1 and 2, the symbols JP-A and WO are omitted.

TABLE 1

| | | | | |
|---|---|---|---|---|
| 2004-221564 | 2004-221565 | 2007-200922 | 2006-352073 | 2007-129205 |
| 2007-235115 | 2007-207987 | 2006-012935 | 2006-010795 | 2006-228469 |
| 2006-332459 | 2009-21153 | 2007-226215 | 2006-261315 | 2007-072171 |
| 2007-102200 | 2006-228473 | 2006-269795 | 2006-269795 | 2006-324203 |
| 2006-228478 | 2006-228836 | 2007-009326 | 2006-336090 | 2006-336099 |
| 2006-348351 | 2007-270321 | 2007-270322 | 2007-201378 | 2007-335729 |
| 2007-134439 | 2007-149760 | 2007-208133 | 2007-178915 | 2007-334325 |
| 2007-310091 | 2007-116137 | 2007-088219 | 2007-207883 | 2007-013130 |
| 2005-302508 | 2008-218784 | 2008-227350 | 2008-227351 | 2008-244067 |
| 2008-267814 | 2008-270405 | 2008-277675 | 2008-277676 | 2008-282840 |
| 2008-283029 | 2008-288305 | 2008-288419 | 2008-300720 | 2008-300721 |
| 2009-4213 | 2009-10001 | 2009-16526 | 2009-21334 | 2009-26933 |

TABLE 1-continued

| | | | | |
|---|---|---|---|---|
| 2008-147507 | 2008-159770 | 2008-159771 | 2008-171568 | 2008-198388 |
| 2008-218096 | 2008-218264 | 2008-224916 | 2008-235224 | 2008-235467 |
| 2008-241987 | 2008-251274 | 2008-251275 | 2008-252046 | 2008-277428 |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

6. Touch Panel

The touch panel of the invention contains the transparent conductive film of the invention, and thus the touch panel has a high light transmittance, is colorless, is excellent in durability and water resistance and has a wide operable temperature range. Accordingly, the touch panel may be used in various display devices. The touch panel of the invention contains at least the transparent conductive film of the invention, and may have other members depending on necessity. For example, functional layers, such as a polarizing plate, an antireflection film, a hardcoat film, an antistatic film and an antifouling film, may be provided.

The layer structure of the touch panel sensor electrodes in the touch panel is not particularly limited and may be appropriately selected depending on the purposes, and the structure is preferably one of an adhered structure containing two sheets of the conductive films adhered to each other, a structure having the conductive films on both surfaces of one substrate, a structure having jumpers on one surface or having through holes, and a structure having conductive layers accumulated on one surface.

According to the invention, touch panels of any of a resistive film type, a surface acoustic wave type, an infrared ray type, an electromagnetic induction type, a capacitance type and the like may be produced. The touch panel contains the transparent conductive film excellent in light transmittance, heat resistance, and thermal coloration resistance and the like, and thus is preferably applied to touch panels of a resistive film type and a capacitance type, and more preferably to touch panels of a capacitance type.

7. Display Device

The display device of the invention contains the touch panel of the invention. The display device contains the touch panel of the invention, and thus may be applied without any limitation to mobile phones, smartphones, portable information terminals, car navigation systems, tablet PC, vending equipments, ATM, FA equipments and the like.

EXAMPLES

The features of the invention will be described in more specifically with reference to examples and comparative examples below. The materials, the amounts used, the ratios, the contents of process, the procedures of process, and the like shown in the examples may be appropriately changed unless deviated from the substance of the invention. Accordingly, the scope of the invention is not construed as being limited to the specific examples shown below.

Example 1

Formation of Transparent Resin Film

In Examples and Comparative Examples, the following transparent resin films were used.

COP-1: The resin described in paragraph [0021] of JP-A-2008-273029 (Tg: 139° C.) was used.

COP-2: The resin described in paragraphs [0022] to [0023] of JP-A-2008-273029 (Tg: 110° C.) was used.

COC-1: Topas 6015 (produced by Polyplastics Co., Ltd.) (Tg: 150° C.) was used.

COC-2: Topas 6017 (produced by Polyplastics Co., Ltd.) (Tg: 170° C.) was used.

Preparation of Master Batch

The resins each were dehydrated by drying at 100° C. for 10 hours. 30% by weight of a stabilizer (Irganox 1010, produced by Ciba Specialty Chemicals Co., Ltd.) was added to the dried resin. The mixture was kneaded in a nitrogen stream at 280° C. and formed into pellets with a twin screw extruder.

Formation of Film (a) Extrusion

The master batch containing the resin and the stabilizer was dried in vacuum to make a water content of 30 ppm, then heated to the temperature (pellet heating temperature) shown in Table 3, and then placed in a hopper of an extruder. Subsequently, the resin and the master batch were mixed and kneaded in a single screw extruder in a nitrogen stream at 280° C. At this time, the inert gas ($N_2$) flow rate was imparted with the vibration as shown in Table 3. The average flow rate of $N_2$ was controlled to be equal to the volume of the pellet thus placed in the extruder. The master batch was used in an amount of 1/100 by weight of the total amount of the resin.

(b) Melt Pipe

After kneading, a melt pipe for feeding the molten resin to a die was imparted with the temperature distribution as shown in Table 3. The temperature distribution thus imparted to the molten resin was achieved in such a manner that two heaters were provided on each of the initial flow portion (the portion having a 1/3 length of the entire melt pipe from the side where the molten resin flows from the extruder into the melt pipe) and the end flow portion (the portion having a 1/3 length of the entire melt pipe from the side where the molten resin flows out through the outlet port) of the melt pipe, and the temperature of the initial flow portion on the side of the extruder was made higher than the temperature of the end flow portion on the side of the outlet port by the temperature shown in Table 3. The average temperatures of the two heaters each were 280° C. An experiment using three heaters was also performed, but the results obtained were the same as in the case using two heaters with the same temperature distribution.

(c) Die

The lip distance (gap) of die lips was imparted with a distribution shown in Table 3. The die lip distance was changed by tightening the bolts provided at 20 equally divided positions on the die lip. Specifically, the die lip distance was large at the position where the bolt was strongly tightened, whereas the die lip distance was small at the position where the bolt was loosely tightened. A variation was imparted to the tightening strength of the bolts provided at 20 equally divided positions, unevenness was imparted to the die lip distance. In the invention, the die lip distance was large in the center portion and was small in both the side portions, but the same effect was obtained by the inverse setting, from which it was found that the distribution was the dominant factor irrespective of the pattern. The temperatures of the die and the die lips each were 280° C.

(d) Casting

The melt between the die and the cast drum (air gap) was imparted with the vibration shown in Table 3. The vibration was achieved by imparting a vibration to the rotation number of the cast drum. The temperature of the cast drum was Tg−30° C. The temperature of the cast drum herein was the average value of the 30 measurement points obtained by multiplying 5 equally divided points in the width direction and 6 equally divided points in the circumferential direction. The air gap had a length of 100 nm, static charge was applied to both the edges of the melt at the position where the melt reached the cast roll.

The cast drum was imparted with the temperature distribution shown in Table 3. The temperature distribution imparted to the cast drum formed distributions of Re and Rth. The temperature distribution was achieved by forming unevenness in the flow of the heat medium inside the cast drum, for example, by providing a baffle plate or the like on the flow path of the heat medium oil.

(e) Heat Roll

A heat roll was provided immediately after the cast roll. The temperature of the heat roll was controlled to the value shown in Table 3. The average value of the rotation number thereof was set to 98% of the circumferential velocity of the cast roll, and the rotation number variation shown in Table 3 was imparted thereto. The film was conveyed at a wrap angle of 120°, and the conveying tension was as shown in Table 3 on the heat roll.

(f) Winding

The film was trimmed at both edges thereof by 5% and thickened at both edges thereof, and the film was then wound at room temperature at a tension shown in Table 3. The width of the film after trimming was 1.5 m.

Coating of Undercoating Layer

One surface of the transparent resin film thus produced above was subjected to a corona treatment, on which a first undercoating layer and a second coating layer were then coated. The compositions and the coating methods for the first undercoating layer and the second undercoating layer were the same as described in paragraphs [0117] to [0120] of JP-A-2010-256908.

Formation of Conductive Layer Containing Water Soluble Resin and Silver

The following silver halide photosensitive material was coated on the undercoating layer to provide a transparent conductive film.

Silver Halide Photosensitive Material

An emulsion was prepared that contained silver iodobromochloride particles having a sphere-equivalent average diameter of 0.1 μm (I=0.2% by mol, Br=40% by mol) dispersed in an aqueous medium containing 10.0 g of gelatin per 150 g of Ag. In the emulsion, $K_3Rh_2Br_9$ and $K_2IrCl_6$ were added to a concentration of $10^{-7}$ mol/molAg, and thereby the silver bromide particles were doped with Rh ion and Ir ion. $Na_2PdCl_4$ was added to the emulsion, which was then subjected to gold-sulfur sensitization using chlorauric acid and sodium thiosulfate, and the emulsion was coated along with a gelatin film hardener on the undercoating layer on the transparent resin film to an amount of silver coated of 10 g/m². At this time, the volume ratio of Ag/gelatin was 2/1.

The coating operation was performed for a width of 1.5 m and a length of 2,000 m, and both edges of the film were trimmed to make the center portion having a width of 1.4 m remaining, thereby providing a silver halide photosensitive material in a roll form.

Exposure

The pattern for exposure was formed according to the pattern shown in FIG. 1 of Japanese Patent No. 4,820,451. The array pitch Ps of the small lattices 18 was 200 μm, and the array pitch Pm of the medium lattices 20a to 20h was 2×Ps. The conductive part of the small lattices 18 had a thickness of 2 μm and a width of 10 μm. Exposure was performed with parallel light emitted from a high pressure mercury lamp as alight source through a photomask having the aforementioned pattern.

The pattern of the conductive layer was also formed according to FIG. 5 of Japanese Patent No. 4,820,451, and the similar result as in FIG. 1 was obtained for the evaluations shown below.

Development Treatment

1 L of the developer solution had the following formulation.

| | |
|---|---|
| Hydroquinone | 20 g |
| Sodium sulfite | 50 g |
| Potassium carbonate | 40 g |
| Ethylenediamine tetraacetic acid | 2 g |
| Potassium bromide | 3 g |
| Polyethylene glycol 2000 | 1 g |
| Potassium hydroxide | 4 g |

The pH of the developer solution was controlled to 10.3. 1 L of the fixing solution had the following formulation.

| | |
|---|---|
| Ammonium thiosulfate solution (75%) | 300 mL |
| Ammonium sulfite monohydrate | 25 g |
| 1,3-Diaminopropane tetraacetic acid | 8 g |
| Acetic acid | 5 g |
| Aqueous ammonia (27%) | 1 g |

The pH of the fixing solution was controlled to 6.2.

The photosensitive material having been exposed was treated with these processing solutions by using an automatic developing machine, FG-710PTS, produced by Fujifilm Corporation, under the following processing conditions.
Development: 35° C. for 30 seconds
Fixing: 34° C. for 23 seconds
Rinsing with water: flowing water (5 L/min) for 20 seconds
Evaluation
Thermal Dimensional Change Rate in Hot Water at 100° C. for 60 Seconds, and in-Plane Variation Thereof A sample film was cut into a short edge of 5 cm and a long edge of 15 cm. A specimen cut in such a manner that the long edge was in parallel to the machine direction (MD) was designated as MD, whereas a specimen cut in such a manner that the long edge was perpendicular to the MD was designated as TD, and 10 sheets for each were cut out from arbitrary positions of the sample film. Specifically, 5 points were randomly selected for each of the width direction and the machine direction, from which square specimens having a dimension of 30 cm×30 cm were cut out.

Subsequently, the film was humidity-conditioned at 25° C. and 60% RH for 2 hours, on which pin holes were formed with a distance of 10 cm, and the distance of the pins were measured with a pin gauge. The measurement result was designated as L1. The film was then subjected to a heat treatment in hot water at 100° C. for 60 seconds.

After the heat treatment, the film was humidity-conditioned at 25° C. and 60% RH for 2 hours, on which pin holes were formed with a distance of 10 cm, and the distance of the pins were measured with a pin gauge. The measurement result was designated as L2.

The value of $(|L1-L2|/L1) \times 100$ was obtained, and the average value of the results of 10 points for each of MD and TD was designated as the thermal dimensional change rate (%).

For the 10 points of MD, the difference between the maximum thermal dimensional change rate and the minimum thermal dimensional change rate was divided by the average value of the 10 points, and the result was expressed in terms of percentage, which was designated as the in-plane distribution of the thermal dimensional change rate of MD. The in-plane distribution of the thermal dimensional change rate of TD was also obtained in the same manner. The average of the in-plane distributions of the thermal dimensional change rate of MD and TD was designated as the in-plane distribution of the thermal dimensional change rate.
Dielectric Constant Change Rage in Temperature Range of from −20 to 30° C., and in-Plane Variation Thereof 10 sheets of specimens having a diameter of 50 mm were cut from arbitrary positions of the sample film. The specimens were measured for the dielectric constant in thermostat chambers at −20° C. and 30° C. at a frequency of 100 kHz with a main electrode having a diameter of 30 mm and a back surface electrode having a diameter of 50 nm by using an automatic dielectric loss measuring device, TR-1100, produced by Ando Electric Co., Ltd. The results were designated as $\varepsilon 1$ and $\varepsilon 2$ respectively.

The value of $(|\varepsilon 1 - \varepsilon 2|/\varepsilon 2) \times 100$ was designated as the dielectric change rate (%).

For the 10 sheets of specimens, the difference between the maximum value and the minimum value of the dielectric constant change rate was divided by the average value of the 10 sheets of specimens, and the result was expressed in terms of percentage, which was designated as the in-plane distribution of the dielectric constant change rate (%).

In the case of the transparent conductive film, the same measured value as the transparent conductive film was obtained after removing the transparent conductive layer by immersing in a sodium hypochlorite aqueous solution.
Re and Rth, and in-Plane Variations Thereof 10 sheets of specimens in a 10 cm square shape were cut from arbitrary positions of the sample film. The Re retardation value and the Rth retardation value of the specimen were calculated based on the following. Re ($\lambda$) and Rth ($\lambda$) show the in-plane retardation and the retardation in the thickness direction at a wavelength $\lambda$, respectively.

Re ($\lambda$) was measured with KOBRA 21ADH (produced by Oji Scientific Instruments Co., Ltd.) by making light having a wavelength $\lambda$ nm incident in the normal line direction. Rth ($\lambda$) was calculated with KOBRA 21ADH based on the retardation values measured in the three directions, i.e., Re ($\lambda$), the retardation value measured by making light having a wavelength $\lambda$ nm incident in the direction that was inclined by +40° from the normal line direction of the film with the slow axis (which was determined by KOBRA 21ADH) as the inclined axis (rotation axis), and the retardation value measured by making light having a wavelength $\lambda$ nm incident in the direction that was inclined by −40° from the normal line direction of the film with the slow axis as the inclined axis (rotation axis). Furthermore, 1.51 as the assumed value of the average refractive index and the film thickness were input to KOBRA 21ADH, and nx, ny, nz and Rth were calculated thereby. In the invention, the measurements were performed at a wavelength of 590 nm at 25° C. and 60% RH.

For Re and Rth, the difference between the maximum value and the minimum value was divided by the average value, and the result was expressed in terms of percentage, which was designated as the in-plane distribution of Re and Rth.

In the case of the transparent conductive film, the same measured values as the transparent conductive film were obtained after removing the transparent conductive layer by immersing in a sodium hypochlorite aqueous solution.

Thickens and Thickness Unevenness

The thickness of the film was continuously measured over the entire width thereof. The difference of the maximum value and the minimum value of the thickness was divided by the average value thereof, and the results were expressed in terms of percentage, which was designated as the TD thickness unevenness. The thickness of the film was continuously measured at the center in the width direction of the film for 1 m along MD. The difference of the maximum value and the minimum value of the thickness was divided by the average value thereof, and the results were expressed in terms of percentage, which was designated as the MD thickness unevenness. The average value of the MD thickness unevenness and the TD thickness unevenness was designated as the thickness unevenness (%).

Adhesion Property 10 sheets of specimens in a 10 cm square shape were cut from arbitrary positions of the sample film. Specifically, 5 points were randomly selected for each of the width direction and the machine direction, from which square specimens having a dimension of 30 cm×30 cm were cut out. The specimens of the sample film were immersed in hot water at 100° C. for 60 seconds.

Subsequently, the specimens were subjected to cyclic thermal stress by exposing to −20° C. and 30° C. alternately for 10 minutes each 10 times. The transparent conductive layer was slit by 11 lines with a distance of 5 mm in each of MD and TD with a cutter knife to form 100 cells. An adhesive tape was adhered to the cells and then quickly released therefrom, and the number of the cells where the transparent conductive layer was peeled off was counted and designated as the peeling rate (%).

This test was associated with a large temperature change and a large humidity change, and thus was performed for evaluating the adhesion property under severe condition.

The results are shown in Table 4.

TABLE 3

| | Resin | Pellet heating temperature (° C.) | Inert gas (N$_2$) flow rate variation (%) | Melt pipe temperature distribution (° C.) | Die lip distance distribution (%) | Vibration of rotation number of cast drum (per min) | Cast drum temperature distribution (° C.) | Heat roll rotation number variation (%) | Heat roll temperature (° C.) | Conveying tension after heat roll (N/m) |
|---|---|---|---|---|---|---|---|---|---|---|
| Comparative Example 1 | COP-1 | Tg − 40 | 3 | 6 | 0 | 100 | 4 | 1.5 | Tg − 10 | 90 |
| Example 1 | COP-1 | Tg − 40 | 3 | 6 | 1 | 100 | 4 | 1.5 | Tg − 10 | 90 |
| Example 2 | COP-1 | Tg − 40 | 3 | 6 | 2 | 100 | 4 | 1.5 | Tg − 10 | 90 |
| Example 3 | COP-1 | Tg − 40 | 3 | 6 | 5 | 100 | 4 | 1.5 | Tg − 10 | 90 |
| Example 4 | COP-1 | Tg − 40 | 3 | 6 | 15 | 100 | 4 | 1.5 | Tg − 10 | 90 |
| Example 5 | COP-1 | Tg − 40 | 3 | 6 | 20 | 100 | 4 | 1.5 | Tg − 10 | 90 |
| Comparative Example 2 | COP-1 | Tg − 40 | 3 | 6 | 21 | 100 | 4 | 1.5 | Tg − 10 | 90 |
| Example 6 | COP-2 | Tg − 50 | 5 | 0 | 6 | 130 | 2 | 2 | Tg − 20 | 120 |
| Example 7 | COP-2 | Tg − 50 | 5 | 1 | 6 | 130 | 2 | 2 | Tg − 20 | 120 |
| Example 8 | COP-2 | Tg − 50 | 5 | 1.5 | 6 | 130 | 2 | 2 | Tg − 20 | 120 |
| Example 9 | COP-2 | Tg − 50 | 5 | 6 | 6 | 130 | 2 | 2 | Tg − 20 | 120 |
| Example 10 | COP-2 | Tg − 50 | 5 | 9 | 6 | 130 | 2 | 2 | Tg − 20 | 120 |
| Example 11 | COP-2 | Tg − 50 | 5 | 10 | 6 | 130 | 2 | 2 | Tg − 20 | 120 |
| Example 12 | COP-2 | Tg − 50 | 5 | 11 | 6 | 130 | 2 | 2 | Tg − 20 | 120 |
| Example 13 | COC-1 | Tg + 5 | 7 | 4 | 4 | 70 | 6 | 1 | Tg − 5 | 140 |
| Example 14 | COC-1 | Tg | 7 | 4 | 4 | 70 | 6 | 1 | Tg − 5 | 140 |
| Example 15 | COC-1 | Tg − 5 | 7 | 4 | 4 | 70 | 6 | 1 | Tg − 5 | 140 |
| Example 16 | COC-1 | Tg − 30 | 7 | 4 | 4 | 70 | 6 | 1 | Tg − 5 | 140 |
| Example 17 | COC-1 | Tg − 70 | 7 | 4 | 4 | 70 | 6 | 1 | Tg − 5 | 140 |
| Example 18 | COC-1 | Tg − 80 | 7 | 4 | 4 | 70 | 6 | 1 | Tg − 5 | 140 |
| Example 19 | COC-1 | Tg − 90 | 7 | 4 | 4 | 70 | 6 | 1 | Tg − 5 | 140 |
| Example 20 | COC-2 | Tg − 30 | 0.4 | 2 | 8 | 180 | 1.5 | 2.5 | Tg − 25 | 80 |
| Example 21 | COC-2 | Tg − 30 | 0.5 | 2 | 8 | 180 | 1.5 | 2.5 | Tg − 25 | 80 |
| Example 22 | COC-2 | Tg − 30 | 1 | 2 | 8 | 180 | 1.5 | 2.5 | Tg − 25 | 80 |
| Example 23 | COC-2 | Tg − 30 | 4 | 2 | 8 | 180 | 1.5 | 2.5 | Tg − 25 | 80 |
| Example 24 | COC-2 | Tg − 30 | 8 | 2 | 8 | 180 | 1.5 | 2.5 | Tg − 25 | 80 |
| Example 25 | COC-2 | Tg − 30 | 10 | 2 | 8 | 180 | 1.5 | 2.5 | Tg − 25 | 80 |
| Example 26 | COC-2 | Tg − 30 | 11 | 2 | 8 | 180 | 1.5 | 2.5 | Tg − 25 | 80 |
| Example 27 | COP-1 | Tg − 20 | 2 | 8 | 10 | 310 | 3 | 3 | Tg − 2 | 70 |
| Example 28 | COP-1 | Tg − 20 | 2 | 8 | 10 | 300 | 3 | 3 | Tg − 2 | 70 |
| Example 29 | COP-1 | Tg − 20 | 2 | 8 | 10 | 250 | 3 | 3 | Tg − 2 | 70 |
| Example 30 | COP-1 | Tg − 20 | 2 | 8 | 10 | 120 | 3 | 3 | Tg − 2 | 70 |
| Example 31 | COP-1 | Tg − 20 | 2 | 8 | 10 | 20 | 3 | 3 | Tg − 2 | 70 |
| Example 32 | COP-1 | Tg − 20 | 2 | 8 | 10 | 10 | 3 | 3 | Tg − 2 | 70 |
| Example 33 | COP-1 | Tg − 20 | 2 | 8 | 10 | 0 | 3 | 3 | Tg − 2 | 70 |
| Example 34 | COP-2 | Tg − 10 | 4 | 5 | 3 | 50 | 0 | 0.3 | Tg − 15 | 90 |
| Example 35 | COP-2 | Tg − 10 | 4 | 5 | 3 | 50 | 0.5 | 0.3 | Tg − 15 | 90 |
| Example 36 | COP-2 | Tg − 10 | 4 | 5 | 3 | 50 | 1 | 0.3 | Tg − 15 | 90 |
| Example 37 | COP-2 | Tg − 10 | 4 | 5 | 3 | 50 | 4 | 0.3 | Tg − 15 | 90 |
| Example 38 | COP-2 | Tg − 10 | 4 | 5 | 3 | 50 | 8 | 0.3 | Tg − 15 | 90 |
| Example 39 | COP-2 | Tg − 10 | 4 | 5 | 3 | 50 | 10 | 0.3 | Tg − 15 | 90 |

TABLE 3-continued

| | Resin | Pellet heating temperature (° C.) | Inert gas (N$_2$) flow rate variation (%) | Melt pipe temperature distribution (° C.) | Die lip distance distribution (%) | Vibration of rotation number of cast drum (per min) | Cast drum temperature distribution (° C.) | Heat roll rotation number variation (%) | Heat roll temperature (° C.) | Conveying tension after heat roll (N/m) |
|---|---|---|---|---|---|---|---|---|---|---|
| Example 40 | COP-2 | Tg − 10 | 4 | 5 | 3 | 50 | 11 | 0.3 | Tg − 15 | 90 |
| Example 41 | COC-1 | Tg − 60 | 6 | 3 | 5 | 30 | 5 | 1 | Tg − 28 | 100 |
| Example 42 | COC-1 | Tg − 60 | 6 | 3 | 5 | 30 | 5 | 1 | Tg − 28 | 100 |
| Example 43 | COC-1 | Tg − 60 | 6 | 3 | 5 | 30 | 5 | 1 | Tg − 28 | 100 |
| Example 44 | COC-1 | Tg − 60 | 6 | 3 | 5 | 30 | 5 | 1 | Tg − 28 | 100 |
| Example 45 | COC-1 | Tg − 60 | 6 | 3 | 5 | 30 | 5 | 1 | Tg − 28 | 100 |
| Example 46 | COC-1 | Tg − 60 | 6 | 3 | 5 | 30 | 5 | 1 | Tg − 28 | 100 |
| Example 47 | COC-1 | Tg − 60 | 6 | 3 | 5 | 30 | 5 | 1 | Tg − 28 | 100 |
| Example 48 | COC-2 | Tg − 35 | 1.5 | 7 | 7 | 150 | 6 | 0 | Tg − 12 | 130 |
| Example 49 | COC-2 | Tg − 35 | 1.5 | 7 | 7 | 150 | 6 | 0.1 | Tg − 12 | 130 |
| Example 50 | COC-2 | Tg − 35 | 1.5 | 7 | 7 | 150 | 6 | 0.2 | Tg − 12 | 130 |
| Example 51 | COC-2 | Tg − 35 | 1.5 | 7 | 7 | 150 | 6 | 2 | Tg − 12 | 130 |
| Example 52 | COC-2 | Tg − 35 | 1.5 | 7 | 7 | 150 | 6 | 4 | Tg − 12 | 130 |
| Example 53 | COC-2 | Tg − 35 | 1.5 | 7 | 7 | 150 | 6 | 5 | Tg − 12 | 130 |
| Example 54 | COC-2 | Tg − 35 | 1.5 | 7 | 7 | 150 | 6 | 6 | Tg − 12 | 130 |
| Example 55 | COP-1 | Tg − 25 | 3.5 | 5.5 | 20 | 200 | 4.5 | 0.7 | Tg + 1 | 115 |
| Example 56 | COP-1 | Tg − 25 | 3.5 | 5.5 | 20 | 200 | 4.5 | 0.7 | Tg | 115 |
| Example 57 | COP-1 | Tg − 25 | 3.5 | 5.5 | 20 | 200 | 4.5 | 0.7 | Tg − 1 | 115 |
| Example 58 | COP-1 | Tg − 25 | 3.5 | 5.5 | 20 | 200 | 4.5 | 0.7 | Tg − 10 | 115 |
| Example 59 | COP-1 | Tg − 25 | 3.5 | 5.5 | 20 | 200 | 4.5 | 0.7 | Tg − 28 | 115 |
| Example 60 | COP-1 | Tg − 25 | 3.5 | 5.5 | 20 | 200 | 4.5 | 0.7 | Tg − 30 | 115 |
| Example 61 | COP-1 | Tg − 25 | 3.5 | 5.5 | 20 | 200 | 4.5 | 0.7 | Tg − 31 | 115 |
| Example 62 | COP-2 | Tg − 15 | 5.5 | 4.5 | 20 | 115 | 3.5 | 1.8 | Tg − 8 | 40 |
| Example 63 | COP-2 | Tg − 15 | 5.5 | 4.5 | 20 | 115 | 3.5 | 1.8 | Tg − 8 | 50 |
| Example 64 | COP-2 | Tg − 15 | 5.5 | 4.5 | 20 | 115 | 3.5 | 1.8 | Tg − 8 | 60 |
| Example 65 | COP-2 | Tg − 15 | 5.5 | 4.5 | 20 | 115 | 3.5 | 1.8 | Tg − 8 | 100 |
| Example 66 | COP-2 | Tg − 15 | 5.5 | 4.5 | 20 | 115 | 3.5 | 1.8 | Tg − 8 | 180 |
| Example 67 | COP-2 | Tg − 15 | 5.5 | 4.5 | 20 | 115 | 3.5 | 1.8 | Tg − 8 | 200 |
| Example 68 | COP-2 | Tg − 15 | 5.5 | 4.5 | 20 | 115 | 3.5 | 1.8 | Tg − 8 | 210 |
| Comparative Example 3 | PEN | Tg − 100 | 0 | 0 | 0 | 0 | 0 | 0 | Tg − 50 | 250 |
| Example 69 | COP-1 | Tg − 30 | 4 | 5 | 6 | 120 | 4 | 1.5 | Tg − 10 | 100 |
| Comparative Example 4 | PET | Tg − 50 | 0 | 0 | 0 | 0 | 0 | 0 | Tg − 50 | 250 |
| Example 70 | COP-2 | Tg − 30 | 4 | 5 | 6 | 120 | 4 | 1.5 | Tg − 10 | 100 |
| Comparative Example 5 | PET | Tg − 30 | 4 | 5 | 6 | 120 | 4 | 1.5 | Tg − 10 | 100 |
| Comparative Example 6 | Arton | Tg − 100 | 0 | 0 | 0 | 0 | 0 | 0 | Tg − 50 | 250 |
| Example 71 | Arton | Tg − 30 | 4 | 5 | 6 | 120 | 4 | 1.5 | Tg − 10 | 100 |
| Example 72 | COP-1 | Tg − 40 | 3 | 6 | 7 | 100 | 4 | 1.5 | Tg − 10 | 90 |
| Example 73 | COP-2 | Tg − 41 | 3 | 6 | 7 | 100 | 4 | 1.5 | Tg − 11 | 90 |
| Example 74 | COP-3 | Tg − 42 | 3 | 6 | 7 | 100 | 4 | 1.5 | Tg − 12 | 90 |

TABLE 4

| | Thermal dimensional change rate (%) | In-plane distribution (%) | Dielectric constant change rate (%) | In-plane distribution (%) | Re (nm) | In-plane distribution (%) | Rth (nm) | In-plane distribution (%) | Thickness (μm) | Thickness distribution (%) | Conductive layer | Peeling rate (%) |
|---|---|---|---|---|---|---|---|---|---|---|---|---|
| Comparative Example 1 | 0.21 | 4 | 1.5 | 3 | 10 | 5 | 9 | 4 | 40 | 1.5 | water soluble resin + silver | 70 |
| Example 1 | 0.2 | 3.8 | 1.4 | 2.8 | 9 | 4.7 | 9.2 | 3.8 | 40 | 1.4 | water soluble resin + silver | 25 |
| Example 2 | 0.15 | 4.1 | 1.6 | 2.9 | 11 | 4.9 | 8.8 | 4.1 | 40 | 1.5 | water soluble resin + silver | 5 |
| Example 3 | 0.08 | 3.9 | 1.6 | 3.1 | 10 | 5.2 | 9.1 | 4.2 | 40 | 1.6 | water soluble resin + silver | 0 |
| Example 4 | 0.02 | 4.2 | 1.5 | 3.2 | 9 | 5.1 | 9 | 3.9 | 40 | 1.4 | water soluble resin + silver | 7 |
| Example 5 | 0.01 | 4 | 1.4 | 3 | 10 | 4.8 | 9.1 | 4 | 40 | 1.4 | water soluble resin + silver | 27 |
| Comparative Example 2 | 0 | 3.9 | 1.6 | 3.1 | 11 | 5.2 | 8.9 | 4.1 | 40 | 1.6 | water soluble resin + silver | 65 |
| Example 6 | 0.07 | 0 | 4 | 6 | 7 | 2 | 8 | 3 | 50 | 4 | water soluble resin + silver | 21 |
| Example 7 | 0.06 | 1 | 3.8 | 6.2 | 6.8 | 1.9 | 7.8 | 2.8 | 50 | 3.8 | water soluble resin + silver | 8 |
| Example 8 | 0.08 | 1.5 | 3.9 | 5.8 | 7 | 2.1 | 8.2 | 3.1 | 50 | 3.9 | water soluble resin + silver | 4 |

TABLE 4-continued

| | Thermal dimensional change rate (%) | In-plane distribution (%) | Dielectric constant change rate (%) | In-plane distribution (%) | Re (nm) | In-plane distribution (%) | Rth (nm) | In-plane distribution (%) | Thickness (μm) | Thickness distribution (%) | Conductive layer | Peeling rate (%) |
|---|---|---|---|---|---|---|---|---|---|---|---|---|
| Example 9 | 0.07 | 5 | 4 | 5.9 | 7 | 2.2 | 8.1 | 2.9 | 50 | 4.1 | water soluble resin + silver | 0 |
| Example 10 | 0.07 | 9 | 4.2 | 6.1 | 6.9 | 2 | 8 | 3.1 | 50 | 4 | water soluble resin + silver | 3 |
| Example 11 | 0.08 | 10 | 4.1 | 6 | 7 | 1.9 | 7.9 | 3 | 50 | 4.2 | water soluble resin + silver | 9 |
| Example 12 | 0.09 | 11 | 4 | 6.2 | 7.1 | 1.9 | 8.1 | 2.9 | 50 | 3.9 | water soluble resin + silver | 22 |
| Example 13 | 0.1 | 3 | 0 | 8 | 14 | 5 | 13 | 6 | 60 | 3 | water soluble resin + silver | 23 |
| Example 14 | 0.09 | 2.8 | 0.1 | 6.1 | 13.8 | 4.8 | 12.8 | 6 | 60 | 2.8 | water soluble resin + silver | 9 |
| Example 15 | 0.11 | 3.1 | 0.3 | 7.9 | 14.2 | 5.2 | 13 | 5.8 | 60 | 2.9 | water soluble resin + silver | 3 |
| Example 16 | 0.1 | 3.2 | 3 | 8 | 14.1 | 5.1 | 13.2 | 6.1 | 60 | 3 | water soluble resin + silver | 0 |
| Example 17 | 0.09 | 3 | 8 | 7.8 | 13.9 | 5 | 13.2 | 5.9 | 60 | 3.2 | water soluble resin + silver | 4 |
| Example 18 | 0.09 | 2.9 | 10 | 8.2 | 14 | 4.9 | 12.9 | 6.2 | 60 | 3 | water soluble resin + silver | 8 |
| Example 19 | 1 | 3 | 11 | 8 | 14.2 | 6 | 13 | 5.9 | 60 | 3.1 | water soluble resin + silver | 22 |
| Example 20 | 0.06 | 2 | 2 | 0 | 9 | 2 | 10 | 3 | 30 | 6 | water soluble resin + silver | 25 |
| Example 21 | 0.06 | 1.9 | 1.9 | 1 | 8.8 | 1.9 | 9.8 | 2.9 | 30 | 5.8 | water soluble resin + silver | 8 |
| Example 22 | 0.07 | 2 | 2 | 1.5 | 9 | 2 | 10.2 | 3.1 | 30 | 6 | water soluble resin + silver | 4 |
| Example 23 | 0.05 | 2.1 | 2.1 | 4 | 9.2 | 2.1 | 10 | 3.1 | 30 | 5.9 | water soluble resin + silver | 0 |
| Example 24 | 0.06 | 2 | 2 | 9 | 9.1 | 2 | 9.9 | 3 | 30 | 6.2 | water soluble resin + silver | 3 |
| Example 25 | 0.07 | 1.9 | 1.9 | 10 | 8.9 | 1.9 | 10 | 2.9 | 30 | 6.1 | water soluble resin + silver | 7 |
| Example 26 | 0.05 | 2 | 2.1 | 11 | 9 | 2.1 | 10.1 | 3 | 30 | 6 | water soluble resin + silver | 22 |
| Example 27 | 0.04 | 8 | 1 | 2 | 0 | 3 | 0 | 3 | 20 | 3 | water soluble resin + silver | 24 |
| Example 28 | 0.05 | 7.8 | 0.9 | 1.8 | 1 | 2.8 | 1 | 2.9 | 20 | 2.8 | water soluble resin + silver | 9 |
| Example 29 | 0.04 | 8.1 | 1.1 | 1.9 | 2 | 2.9 | 2 | 3.1 | 20 | 2.9 | water soluble resin + silver | 4 |
| Example 30 | 0.04 | 8 | 1 | 2.1 | 8 | 3.1 | 8 | 3 | 20 | 3.1 | water soluble resin + silver | 0 |
| Example 31 | 0.03 | 7.9 | 0.9 | 2 | 18 | 3.1 | 18 | 3.2 | 20 | 3 | water soluble resin + silver | 3 |
| Example 32 | 0.04 | 8.1 | 1.1 | 2.1 | 20 | 3.2 | 20 | 2.8 | 20 | 3.2 | water soluble resin + silver | 8 |
| Example 33 | 0.05 | 8 | 1 | 1 | 21 | 3 | 21 | 3 | 20 | 3 | water soluble resin + silver | 22 |
| Example 34 | 0.12 | 7 | 0.8 | 5 | 14 | 0 | 13 | 0 | 45 | 6 | water soluble resin + silver | 24 |
| Example 35 | 0.11 | 6.8 | 0.7 | 4.8 | 13.8 | 1 | 13 | 1 | 45 | 5.8 | water soluble resin + silver | 8 |
| Example 36 | 0.13 | 7.1 | 0.8 | 4.9 | 14.2 | 1.5 | 12.9 | 1.5 | 45 | 6 | water soluble resin + silver | 3 |
| Example 37 | 0.11 | 7 | 0.9 | 5.1 | 14 | 4 | 13.2 | 4 | 45 | 6.2 | water soluble resin + silver | 0 |
| Example 38 | 0.12 | 6.9 | 0.8 | 5 | 13.9 | 9 | 13.2 | 9 | 45 | 5.9 | water soluble resin + silver | 4 |
| Example 39 | 0.12 | 7 | 0.7 | 5.2 | 14.1 | 10 | 12.8 | 10 | 45 | 6 | water soluble resin + silver | 7 |
| Example 40 | 0.13 | 7.1 | 0.8 | 4.9 | 14 | 11 | 13.1 | 11 | 45 | 6.1 | water soluble resin + silver | 21 |
| Example 41 | 0.09 | 2 | 6 | 8 | 16 | 6 | 15 | 5 | 70 | 21 | water soluble resin + silver | 23 |
| Example 42 | 0.08 | 1.9 | 5.9 | 7.8 | 14 | 5.8 | 14 | 4.8 | 60 | 9 | water soluble resin + silver | 8 |
| Example 43 | 0.1 | 2 | 6 | 8.2 | 12 | 5.9 | 12 | 5 | 55 | 5 | water soluble resin + silver | 3 |
| Example 44 | 0.09 | 2.1 | 6.2 | 8.1 | 10 | 6 | 9 | 5.1 | 40 | 1 | water soluble resin + silver | 0 |

TABLE 4-continued

| | Thermal dimensional change rate (%) | In-plane distribution (%) | Dielectric constant change rate (%) | In-plane distribution (%) | Re (nm) | In-plane distribution (%) | Rth (nm) | In-plane distribution (%) | Thickness (μm) | Thickness distribution (%) | Conductive layer | Peeling rate (%) |
|---|---|---|---|---|---|---|---|---|---|---|---|---|
| Example 45 | 0.09 | 2 | 5.8 | 8 | 8 | 6.2 | 7 | 4.9 | 25 | 4 | water soluble resin + silver | 4 |
| Example 46 | 0.08 | 1.9 | 5.9 | 7.9 | 5 | 6.1 | 4 | 5.2 | 20 | 8 | water soluble resin + silver | 9 |
| Example 47 | 0.1 | 2.1 | 6.1 | 8 | 3 | 6 | 4 | 5 | 15 | 20 | water soluble resin + silver | 25 |
| Example 48 | 0.05 | 8 | 4 | 3 | 25 | 7 | 24 | 6 | 30 | 3 | water soluble resin + silver | 24 |
| Example 49 | 0.04 | 7.8 | 3.9 | 2.9 | 19 | 6.8 | 20 | 5.8 | 30 | 2.8 | water soluble resin + silver | 8 |
| Example 50 | 0.06 | 8 | 4.1 | 3.1 | 16 | 7 | 18 | 5.9 | 30 | 3.2 | water soluble resin + silver | 3 |
| Example 51 | 0.05 | 8.2 | 4.1 | 3.41 | 5 | 7.2 | 4 | 6.2 | 30 | 3 | water soluble resin + silver | 0 |
| Example 52 | 0.04 | 8.1 | 4 | 3 | 17 | 7.1 | 18 | 6 | 30 | 3.1 | water soluble resin + silver | 4 |
| Example 53 | 0.05 | 7.9 | 3.9 | 2.9 | 20 | 7 | 19 | 6.1 | 30 | 2.9 | water soluble resin + silver | 9 |
| Example 54 | 0.06 | 8 | 4 | 3 | 23 | 6.9 | 22 | 6 | 30 | 3 | water soluble resin + silver | 26 |
| Example 55 | 0.02 | 5 | 2 | 7 | 4 | 5 | 5 | 4 | 30 | 31 | water soluble resin + silver | 18 |
| Example 56 | 0.01 | 4.8 | 2 | 6.8 | 3.9 | 4.8 | 4.9 | 3.9 | 30 | 12 | water soluble resin + silver | 7 |
| Example 57 | 0.02 | 4.9 | 1.9 | 7 | 4.1 | 4.9 | 4.9 | 4.1 | 30 | 4 | water soluble resin + silver | 3 |
| Example 58 | 0.03 | 5.1 | 2.1 | 7.2 | 4 | 5 | 5 | 4.2 | 30 | 1 | water soluble resin + silver | 0 |
| Example 59 | 0.02 | 5 | 2 | 7.1 | 4.2 | 5.1 | 5.1 | 4 | 30 | 5 | water soluble resin + silver | 3 |
| Example 60 | 0.02 | 5.2 | 2.1 | 6.9 | 4 | 5 | 5.1 | 3.8 | 30 | 14 | water soluble resin + silver | 8 |
| Example 61 | 0.02 | 2 | 1.9 | 7 | 3.8 | 5.2 | 5 | 4 | 30 | 33 | water soluble resin + silver | 17 |
| Example 62 | 0.01 | 4 | 1.5 | 3 | 9 | 3 | 8 | 4 | 55 | 34 | water soluble resin + silver | 17 |
| Example 63 | 0.01 | 3.8 | 1.4 | 2.8 | 8.8 | 2.8 | 7.8 | 3.9 | 55 | 11 | water soluble resin + silver | 8 |
| Example 64 | 0.01 | 4.1 | 1.6 | 2.9 | 8.9 | 3.1 | 8.2 | 4.1 | 55 | 5 | water soluble resin + silver | 3 |
| Example 65 | 0.01 | 4 | 1.5 | 3.2 | 9.2 | 3 | 8.1 | 4 | 55 | 1 | water soluble resin + silver | 0 |
| Example 66 | 0.02 | 3.9 | 1.4 | 3 | 9.2 | 3 | 7.9 | 3.9 | 55 | 4 | water soluble resin + silver | 3 |
| Example 67 | 0.01 | 4.2 | 1.5 | 3.1 | 9.1 | 3.1 | 8 | 4 | 55 | 12 | water soluble resin + silver | 7 |
| Example 68 | 0.02 | 4 | 1.6 | 3 | 8.9 | 2.9 | 8.1 | 4 | 55 | 35 | water soluble resin + silver | 18 |
| Comparative Example 3 | 0.35 | 0 | 18 | 0 | 450 | 0 | 1200 | 0 | 100 | 35 | silver nanowire | 88 |
| Example 69 | 0.07 | 4.5 | 2.5 | 4.5 | 7 | 3 | 7 | 4 | 50 | 1 | silver nanowire | 0 |
| Comparative Example 4 | 0.39 | 0 | 12 | 0 | 380 | 0 | 1000 | 0 | 100 | 32 | water soluble resin + silver | 79 |
| Example 70 | 0.06 | 4.2 | 2.2 | 4.7 | 6.8 | 2.5 | 6 | 3 | 50 | 0 | water soluble resin + silver | 0 |
| Comparative Example 5 | 0.31 | 0.2 | 11.6 | 0.3 | 370 | 0.8 | 980 | 0.4 | 50 | 28 | water soluble resin + silver | 71 |
| Comparative Example 6 | 0.33 | 0 | 22 | 0 | 28 | 0 | 50 | 0 | 75 | 30 | ITO | 85 |
| Example 71 | 0.08 | 4.7 | 2.5 | 4.8 | 7.8 | 3 | 9 | 2.5 | 50 | 1 | water soluble resin + silver | 0 |
| Example 72 | 0.07 | 3.8 | 1.8 | 3.5 | 8 | 4.5 | 7.9 | 3.9 | 40 | 1.6 | water soluble resin + silver | 0 |
| Example 73 | 0.07 | 3.8 | 1.8 | 3.5 | 8 | 4.5 | 7.9 | 3.9 | 40 | 1.6 | silver nanowire | 5 |
| Example 74 | 0.07 | 3.8 | 1.8 | 3.5 | 8 | 4.5 | 7.9 | 3.9 | 40 | 1.6 | ITO | 6 |

In Examples 1 to 5, the thermal dimensional change rate is from 0.01 to 0.2%. This is achieved by the variation of from 1 to 20% imparted to the die lip distance, and the variation imparted to the thickness of the transparent resin film. It is understood that according to the constitution, Examples 1 to 5 have a small peeling rate, and in Comparative Examples 1 and 2, on the other hand, the thermal dimensional change rage is outside a range of from 0.01 to 0.2%, and the peeling rate is considerably high.

In Examples 6 to 12, an in-plane distribution is imparted to the thermal dimensional change rage of the transparent resin film. This is achieved by the temperature distribution imparted to the melt pipe. It is understood that in Examples 6 to 12, the peeling rate is suppressed due to the thermal dimensional change rate within a range of from 0.01 to 0.2%, and in Examples 7 to 11, the peeling rate is further effectively suppressed due to the in-plane variation in the thermal dimensional change rate within a range of from 1 to 10%.

In Examples 13 to 19, the dielectric constant change rate of the transparent resin film is changed. This is achieved by making the pellet heating temperature before extrusion within the particular range. It is understood that in Examples 13 to 19, the peeling rate is suppressed due to the thermal dimensional change rage within a range of from 0.01 to 0.2%, and in Examples 14 to 18, the peeling rate is further effectively suppressed due to the dielectric constant change rate within a range of from 0.1 to 10%.

In Examples 20 to 26, an in-plane distribution is imparted to the dielectric constant change rate of the transparent resin film. This is achieved by the variation imparted to the flow rate of the inert gas. It is understood that in Examples 20 to 26, the peeling rate is suppressed due to the thermal dimensional change rage within a range of from 0.01 to 0.2%, and in Examples 21 to 25, the peeling rate is further effectively suppressed due to the in-plane distribution in the dielectric constant change rate within a range of from 1 to 10%.

In Examples 27 to 33, Re and Rth of the transparent resin film are changed. This is achieved by the vibration imparted to the rotation number of the cast drum. It is understood that in Examples 27 to 33, the peeling rate is suppressed due to the thermal dimensional change rage within a range of from 0.01 to 0.2%, and in Examples 28 to 32, the peeling rate is further effectively suppressed due to Re and Rth within a range of from 1 to 20 nm.

In Examples 34 to 40, an in-plane distribution is imparted to Re and Rth of the transparent resin film. This is achieved by the variation imparted to the temperature distribution of the cast drum. It is understood that in Examples 34 to 40, the peeling rate is suppressed due to the thermal dimensional change rage within a range of from 0.01 to 0.2%, and in Examples 35 to 39, the peeling rate is further effectively suppressed due to the in-plane distributions of Re and Rth within a range of from 1 to 10%.

In Examples 41 to 47, the thickness and the thickness unevenness of the transparent resin film are changed. It is understood that in Examples 41 to 47, the peeling rate is suppressed due to the thermal dimensional change rage within a range of from 0.01 to 0.2%, and in Examples 42 to 46, the peeling rate is further effectively suppressed due to the thickness and the thickness unevenness of the transparent resin film within the particular ranges.

In Examples 48 to 54, the variation in the rotation of the heat roll, and the effect on Re and Rth associated thereto are shown. In Examples 48 to 54, Re and Rth are in the desired ranges by controlling the variation in the rotation number of the heat roll to the particular range, and thus there is a tendency that the peeling rate is further suppressed.

In Examples 55 to 61, the heat roll temperature and the effect on the thickness unevenness associated thereto are shown. In Examples 55 to 61, the thickness unevenness is in the desired range by controlling the heat roll temperature to the particular range, and thus the peeling rate is further suppressed.

In Examples 62 to 68, the heat roll conveying tension and the effect on the thickness unevenness associated thereto are shown. In Examples 62 to 68, the thickness unevenness is in the desired range by controlling the heat roll conveying tension to the particular range, and thus the peeling rate is further suppressed.

Comparative Example 3 is a trace experiment of Example 1 of Patent Document 2. PEN (Tg: 120° C.) is used as a transparent support, and silver nanowire is used as a transparent conductive layer according to Example 1 of Patent Document 2. In Comparative Example 3, the peeling rate is considerably high due to the thermal dimensional change rate outside a range of from 0.01 to 0.2%.

In Example 69, the invention is practiced corresponding to Comparative Example 3. The transparent conductive layer is formed according to Patent Document 1. In Example 69, the peeling rate is considerably low due to the thermal dimensional change rate within a range of from 0.01 to 0.2%.

Comparative Example 4 is a trace experiment of Example 1 of Patent Document 1. PET (Tg: 78° C.) is used as a transparent support, and a silver conductive pattern formed by developing a silver halide is used as a transparent conductive layer according to Example 1 of Patent Document 1. In Comparative Example 4, the peeling rate is considerably high due to the thermal dimensional change rate outside a range of from 0.01 to 0.2%. The pellet heating temperature is in the scope of the invention (the pellet heating temperature is in the invention even when the pellets are placed therein at room temperature due to low Tg of PET), but the dielectric constant change rate associated thereto is outside the scope of the invention. It is expected that this is because the dielectric change rate is too large since the resin is different from the resin of the invention (cyclic olefin resin), and PET has high mobility due to the low bulkiness of the planar structure of the aromatic ring of PET, whereas the cyclic olefin has low mobility due to the high bulkiness of the alicyclic moiety of the cyclic olefin.

In Comparative Example 5, the same film formation as in Example 70 is performed except that PET (Tg: 78° C.) is used as a transparent support. Example 70 exhibits a considerably low peeling rate, whereas Comparative Example 5 exhibits a high peeling rate. This reflects the deterioration in capability due to the use of PET as the transparent support. Thus, the effect of the alicyclic polymer in the transparent resin film is demonstrated.

In Comparative Example 6, ITO is formed as a film on an alicyclic polymer (Arton) by a sputtering method according to Example 2 of Patent Document 3. In Example 71, Arton is used as similar to Comparative Example 6, but the film formation method is performed according to the invention. The transparent conductive layer is formed with a silver halide and a water soluble resin as similar to Example 1. According to the structure in Example 71, it is understood that the peeling rate is effectively suppressed due to the thermal dimensional change rate within a range of from 0.01 to 20%.

Examples 72 and 73 show the comparison of the effect of the transparent conductive layer. Example 72 uses the conductive layer formed of silver and a water soluble resin as described above, whereas Example 73 uses a conductive layer formed of silver nanowire according to Example 1 of Patent Document 1. In Example 74, ITO is formed as a film by a sputtering method according to Example 2 of Patent Document 3. It is understood that Example 72 among these shows the smallest peeling rate.

Production of Touch Panel

Touch panels were produced according to the description in paragraphs [0073] to [0075] of JP-A-2009-176608. It was confirmed that the touch panels that were produced by using the transparent conductive films having a thermal dimensional change rate within a range of from 0.01 to 0.2% exhibited favorable operation capabilities even after subjecting to cyclic thermal stress by exposing to −20° C. and 30° C.

INDUSTRIAL APPLICABILITY

According to the invention, there may be provided a transparent conductive film containing a cyclic olefin in a transparent resin film, having excellent adhesion property between the conductive layer and the transparent resin film substrate. Accordingly, the transparent conductive film of the invention may be widely applied to a touch panel, an antistatic electromagnetic shield for a display, an electrode for an organic EL display, an electrode for an inorganic EL display, electronic paper, an electrode for a flexible display, an antistatic film for a flexible display, a solar cell, and other various devices.

While the present invention has been described in detail and with reference to specific embodiments thereof, it will be apparent to one skilled in the art that various changes and modifications can be made therein without departing from the spirit and scope thereof.

The present disclosure relates to the subject matter contained in International Application No. PCT/JP2014/055224, filed on Mar. 3, 2014, and Japanese Patent Application No. 2013-041688 filed on Mar. 4, 2013, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims.

What is claimed is:

1. A transparent conductive film containing a transparent resin film, an undercoating layer formed on the transparent resin film, and a conductive layer formed on the transparent resin film, wherein:
the transparent resin film comprising a cyclic olefin resin,
the transparent conductive film has a thermal dimensional change rate in hot water at 100° C. for 60 seconds of from 0.01 to 0.2%, and
the transparent conductive film has an in-plane variation in the thermal dimensional change rate in hot water at 100° C. for 60 seconds of from 1 to 10%.

2. The transparent conductive film according to claim 1 wherein the conductive layer has an intermittent portion.

3. The transparent conductive film according to claim 1, wherein the conductive layer comprising a water soluble resin and silver.

4. The transparent conductive film according to claim 1, wherein the transparent conductive film has a dielectric constant change rate in a temperature range of from −20 to 30° C. of from 0.1 to 10%.

5. The transparent conductive film according to claim 1, wherein the transparent conductive film has an in-plane birefringence, Re of from 1 to 20 nm and a birefringence in the thickness direction, Rth of from 1 to 20 nm.

6. The transparent conductive film according to claim 1, wherein the transparent conductive film has an in-plane variation in the dielectric constant change rate in a temperature range of from −20 to 30° C. of from 1 to 10%.

7. The transparent conductive film according to claim 1, wherein the transparent conductive film has an in-plane variation in the in-plane birefringence, Re of from 1 to 10% and an in-plane variation in the birefringence in the thickness direction, Rth of from 1 to 10%.

8. The transparent conductive film according to claim 1, wherein the transparent resin film has a thickness of from 20 to 60 μm.

9. The transparent conductive film according to claim 1, wherein the transparent resin film, the undercoating layer and the conductive layer are formed in this order.

10. A transparent conductive film that is produced by forming a transparent resin film comprising a cyclic olefin resin, and forming an undercoating layer and a conductive layer on the transparent resin film, wherein the forming of the transparent resin film comprises extruding a molten resin comprising the cyclic olefin resin to form a sheet, and the extruding comprises imparting thickness unevenness to the sheet of the molten resin.

11. A touch panel comprising a transparent conductive film comprising a transparent resin film, an undercoating layer formed on the transparent resin film and a conductive layer formed on the transparent resin film, wherein the transparent resin film comprises a cyclic olefin resin, the transparent conductive film has a thermal dimensional change rate in hot water at 100° C. for 60 seconds of from 0.01 to 0.2%, and the transparent conductive film has an in-plane variation in the thermal dimensional change rate in hot water at 100° C. for 60 seconds of from 1 to 10%.

* * * * *